United States Patent [19]

Patrick et al.

[11] Patent Number: 4,949,318

[45] Date of Patent: Aug. 14, 1990

[54] HYDROACOUSTIC SONAR EQUIPMENT

[76] Inventors: Paul H. Patrick, 6345 Bell School Line, Milton, Ontario, Canada, L9T 2Y1; Gerald A. Hunt, 70 Ontario Street, Georgetown, Ontario, Canada, L7G 3L1; Blair E. Sim, 23 English Street, Brampton, Ontario, Canada, L6X 1L5

[21] Appl. No.: 360,200

[22] Filed: Jun. 1, 1989

[51] Int. Cl.[5] ............................................. G01S 15/00
[52] U.S. Cl. ....................................... 367/135; 367/87
[58] Field of Search .................... 367/87, 99, 100, 135; 73/620, 629

[56] References Cited

U.S. PATENT DOCUMENTS 4,016,750  4/1977  Green ..................................... 73/629
4,119,941 10/1978  Moore et al. ......................... 367/134

Primary Examiner—Thomas H. Tarcza
Assistant Examiner—Daniel T. Pihulic
Attorney, Agent, or Firm—Ridout & Maybee

[57] ABSTRACT

The invention relates to a hydroacoustic sonar system in which received signals are processed without extensive filtering thereby to conserve higher fourier components of the received signals and so conserve useful information of targets. This is achieved by using a wideband detector module to effect demodulation of the received signals, and so eliminating the usual intermediate frequency stage. The module comprises a wideband input amplifier, a wideband full wave detector and an active low pass filter having a cut off frequency of at least 50 kHz.

2 Claims, 38 Drawing Sheets

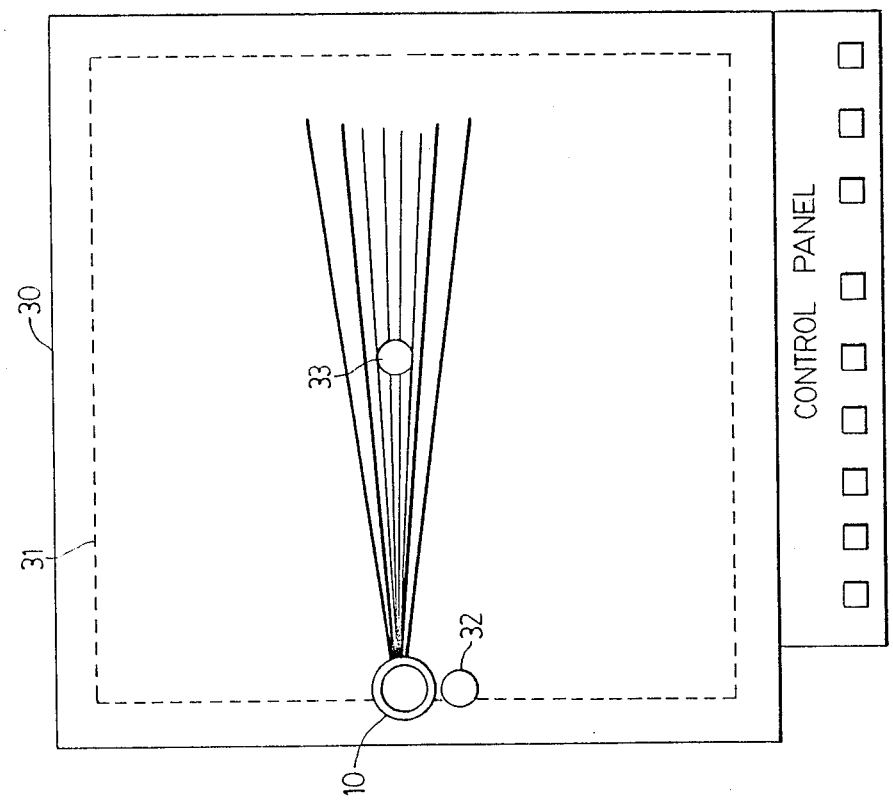

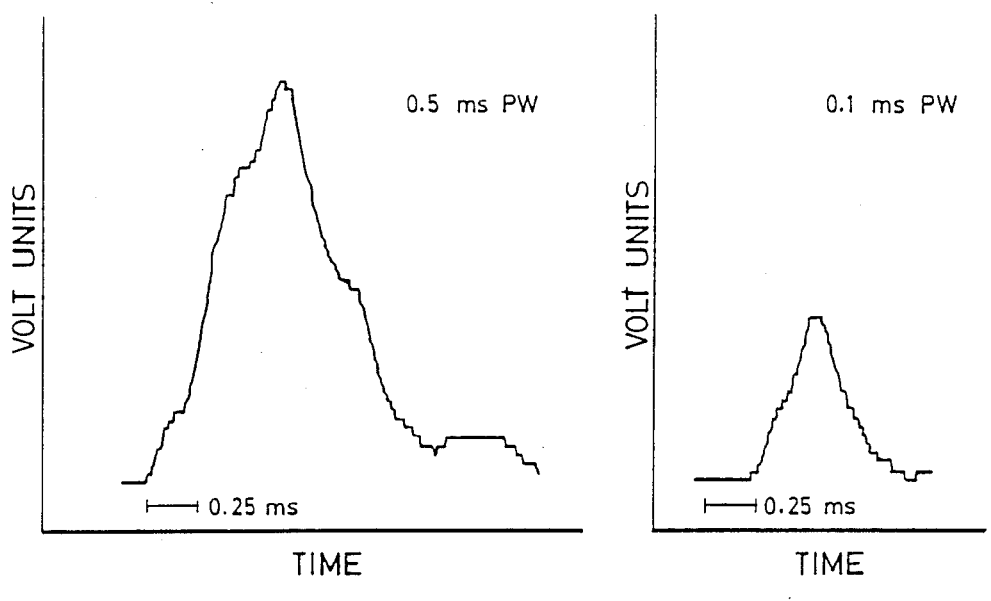
FIG. 12a
FIG. 12c
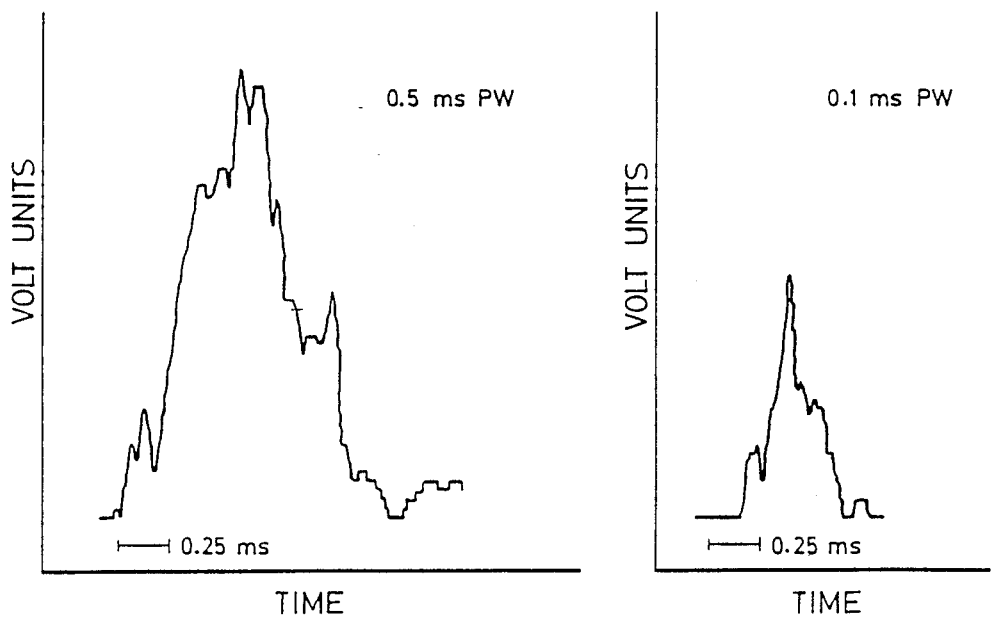
FIG. 12b
FIG. 12d

HYDROACOUSTIC SONAR EQUIPMENT

This invention relates to hydroacoustic sonar equipment and to the detection and examination of underwater targets by the use of such equipment. The invention is especially applicable to the examination of fish populations in environmental studies, but is not necessarily limited to such applications.

To comply with regulatory agencies' requirements, biological studies must be conducted in the vicinity of hydroelectric, nuclear and thermal power stations. Most studies are directed towards fish, with netting being used as the principal method of determining fish composition and abundance in each area under examination. While netting methods cannot be dispensed with entirely, they are labour-intensive and inevitably involve destruction of fish. Hydroacoustics may offer an alternative method for the examination of fish population and distribution which is cost-effective and non-destructive.

Considerable advances have been made in the use of hydroacoustics for fish management. Advances have been made in the areas of developing real time data collection and analysis systems. Another significant contribution has been the development of the dual beam and split beam systems which allow for off-axis correction of target strengths. These latter systems are currently being used for both sizing fish and estimating fish populations in situ. Presently there are concerns whether these systems can be used for estimating fish populations when fish schools are dense. Other concerns exist regarding the possibility of errors associated with estimating target strengths and sizing fish when fish are in different orientations (e.g. lateral versus dorsal aspect, and tilt angle). Furthermore, it is questionable whether commercial sonar systems have the ability to speciate fish and/or distinguish fish from debris based solely on target strengths. The need to speciate fish is critical if hydroacoustics is ever to be used truly remotely.

The present applicants have made a critical study of existing hydroacoustic sonar equipment, which comprises a 420 kHz dual beam transducer, sounder with time varied gain amplifier, and have noted that substantial filtering of the received signal occurs prior to both the intermediate frequency and detector stages of the receiver. This filtering results in a rounding off of the received pulses, with loss of amplitude especially at lower pulse widths. In addition, the selectable bandwidth filter of the sounder has a bandwidth of only 10 kHz, which is inadequate for pulses of the order of 0.1 ms pulse width.

It was concluded that the shortcomings of the existing equipment resulted from the loss of valuable information because of the nature of the filtering. The object of the present invention is to provide a hydroacoustic sonar system in which RF components of the received signals are retained up to the detector stage, thereby to retain the information provided by RF components and also to enable use of low pulse widths so as to obtain higher resolution.

The present invention is based on the use of a wideband sonar detection module, which replaces the intermediate frequency and detector stages of conventional equipment. The module basically comprises a wideband amplifier having a bandwidth of at least 500 kHz, and preferably a bandwidth of at least 1.2 MHz. The output of the amplifier is applied to a full wave wideband detector having a bandwidth not less than 500 kHz, and preferably a bandwidth of at least 1.2 MHz. The detected output is filtered by an active low pass filter having a cut off frequency not less than 50 kHz.

A hydroacoustic sonar detection equipment in accordance with the invention and its use to detect and identify fish and other underwater targets will now be described with reference to the accompanying drawings, in which:

FIG. 4 is a schematic top plan view of an experimental test facility used in comparing the performance of the modified system shown in FIG. 2 with that of the conventional system shown in FIG. 1;

FIGS. 5a–5d respectively illustrate typical sonar displays of the conventional and the modified systems using two different pulse widths;

FIGS. 6a–27a illustrate backscattering curves obtained for various targets using the conventional hydroacoustic sonar system with a pulse width of 5 ms;

FIGS. 6b–27b illustrate backscattering curves obtained for the same targets using the modified system with a pulse width of 0.5 ms;

FIGS. 6c–27c illustrate backscattering curves obtained for the same targets using the conventional system with a pulse width of 0.1 ms;

FIGS. 6d–27d illustrate backscattering curves obtained for the same targets using the modified hydroacoustic system with a pulse width of 1 ms; and FIGS. 28–37 illustrate typical power spectra of the various targets using both the conventional and the modified hydroacoustic systems.

In the following description, the performance of a hydroacoustic sonar equipment in accordance with the present invention will be compared with that of a conventional hydroacoustic sonar equipment. The conventional equipment is of the type comprising a Biosonics 420 kHz dual beam transducer (6 degree, 15 degree), a sounder (Biosonics 101) with time varied gain amplifier, a transducer rotator (Biosonics RC), a tape recorder interface (Biosonics 171), a digital audio tape recorder (Sony DTC 1000), a frequency modulation recorder (Racal Store 7), an oscilloscope (Philips PM 320), a plotter (Hewlett-Packard 7046A), a dual beam processor (Biosonics ESP 181), a PC computer (AT compatible 40 mB), and a printer (Epson FX). The system per se is well known in the art and need not be described in detail. For an understanding of the present invention it will be sufficient to consider the sounder and signal processing stages of the system.

Figure 1:
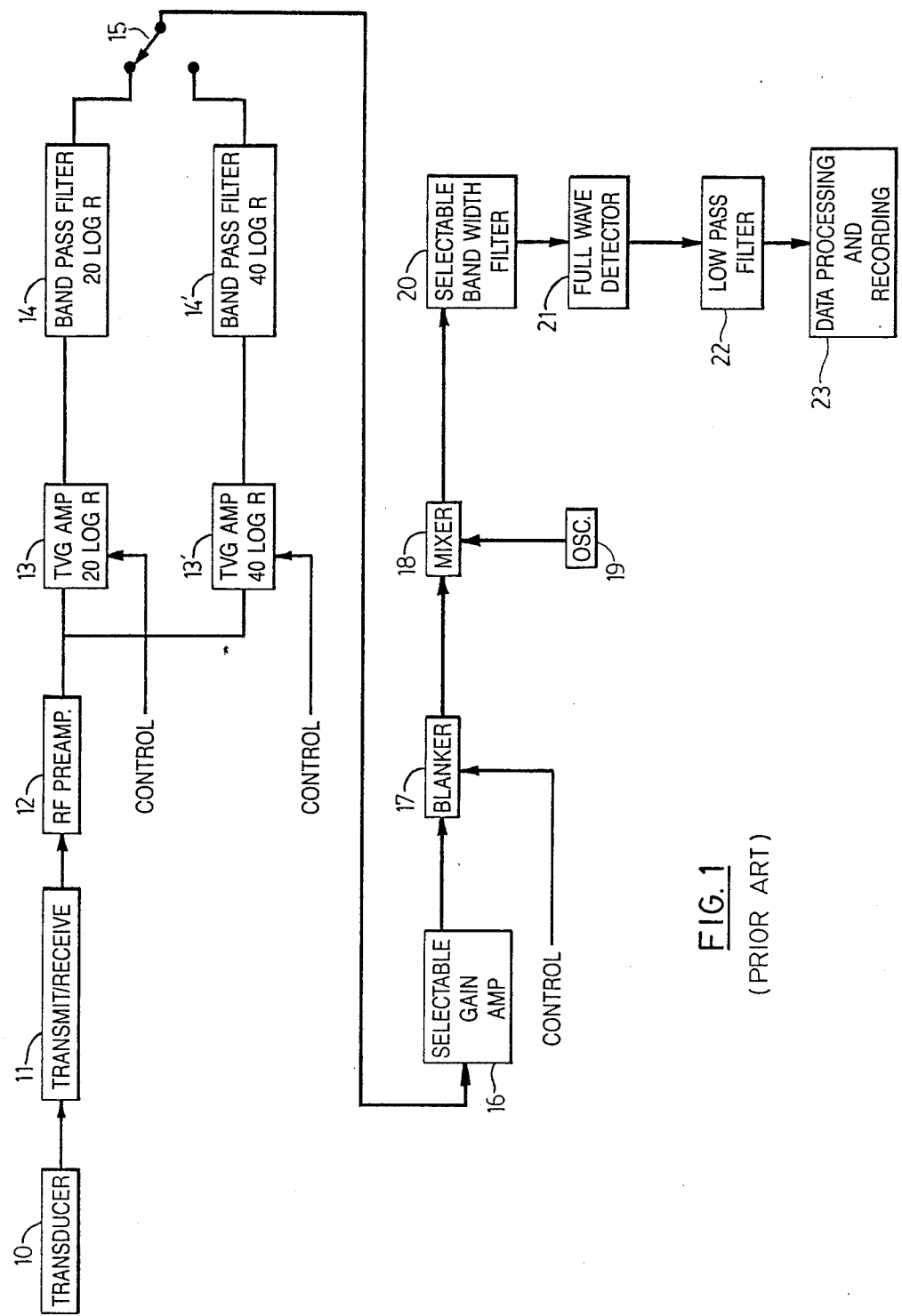
FIG. 1 is a simplified schematic of a conventional hydroacoustic sonar system used to collect information on fish populations.

Thus, FIG. 1 shows the dual beam transducer 10, coupled to a transceiver 11 and operable, during transmission, to direct a beam of sonar pulses of selected pulse width towards a target. Echo pulses are converted to incoming RF pulses by the transducer. The RF pulses are amplified by the preamplifier 12 and channelled via a 20 log R time varied gain receiver 13 (or 40 log R time varied gain receiver 13') and a 20 log R bandpass filter 14 (or 40 log R bandpass filter 14'), according to the setting of a selector switch 15, to a selectable gain amplifier 16. The RF signal from the amplifier 16 is gated in known manner via a blanker 17 to a mixer 18, fed by a local oscillator 19, the resultant IF signal being filtered by a selectable bandwidth filter 20. The filtered output is applied to a full wave detector 21, the detected output pulse passing by a low pass filter 22 to data processing and recording equipment 23.

As previously mentioned, with this system much useful information is lost due to filtering out of RF components prior to the detector stage. The present invention provides a signal processing system which overcomes this disadvantage. The modified system according to the present invention is illustrated in FIG. 2, wherein components which are common to the system of FIG. 1 are denoted by the same reference numerals.

Figure 2:
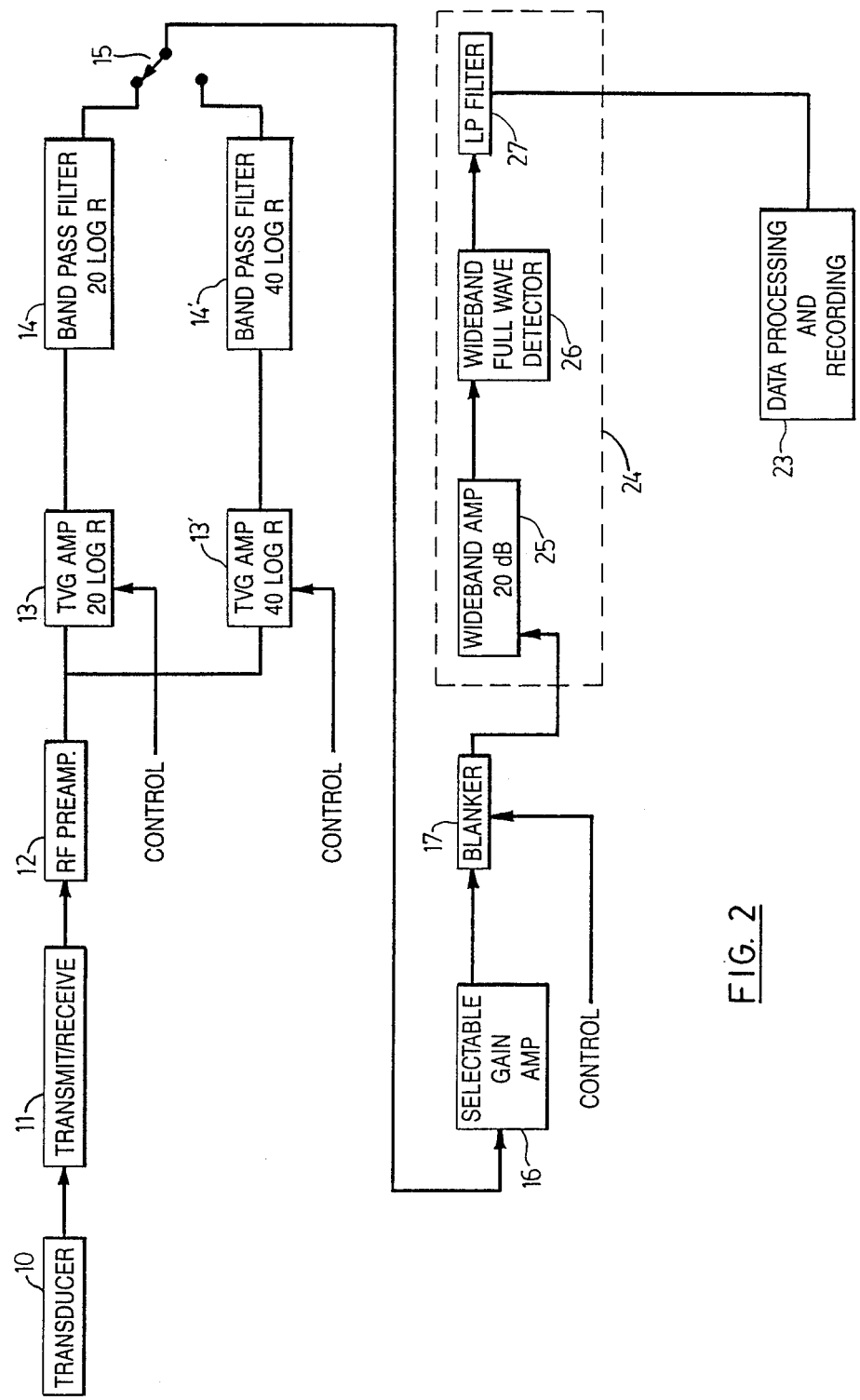
FIG. 2 is a simplified schematic of a modified hydroacoustic sonar detection equipment incorporating a wideband sonar detection module according to the invention.

Referring to FIG. 2, the RF signal downstream of the blanker 17 is received by a wideband sonar detector module 24, which replaces the components 18, 19, 20, 21 and 22 of FIG. 1. This module 24 consists essentially of a wideband input amplifier 25, a wideband full wave detector 26, and a low pass filter 27. The module 24 eliminates an intermediate stage and provides demodulation of the received pulses at a wide enough bandwidth to conserve valuable information which would otherwise be lost by elimination of the higher fourier components of the signal. The module 24 is illustrated in greater detail in FIG. 3.

Figure 3:
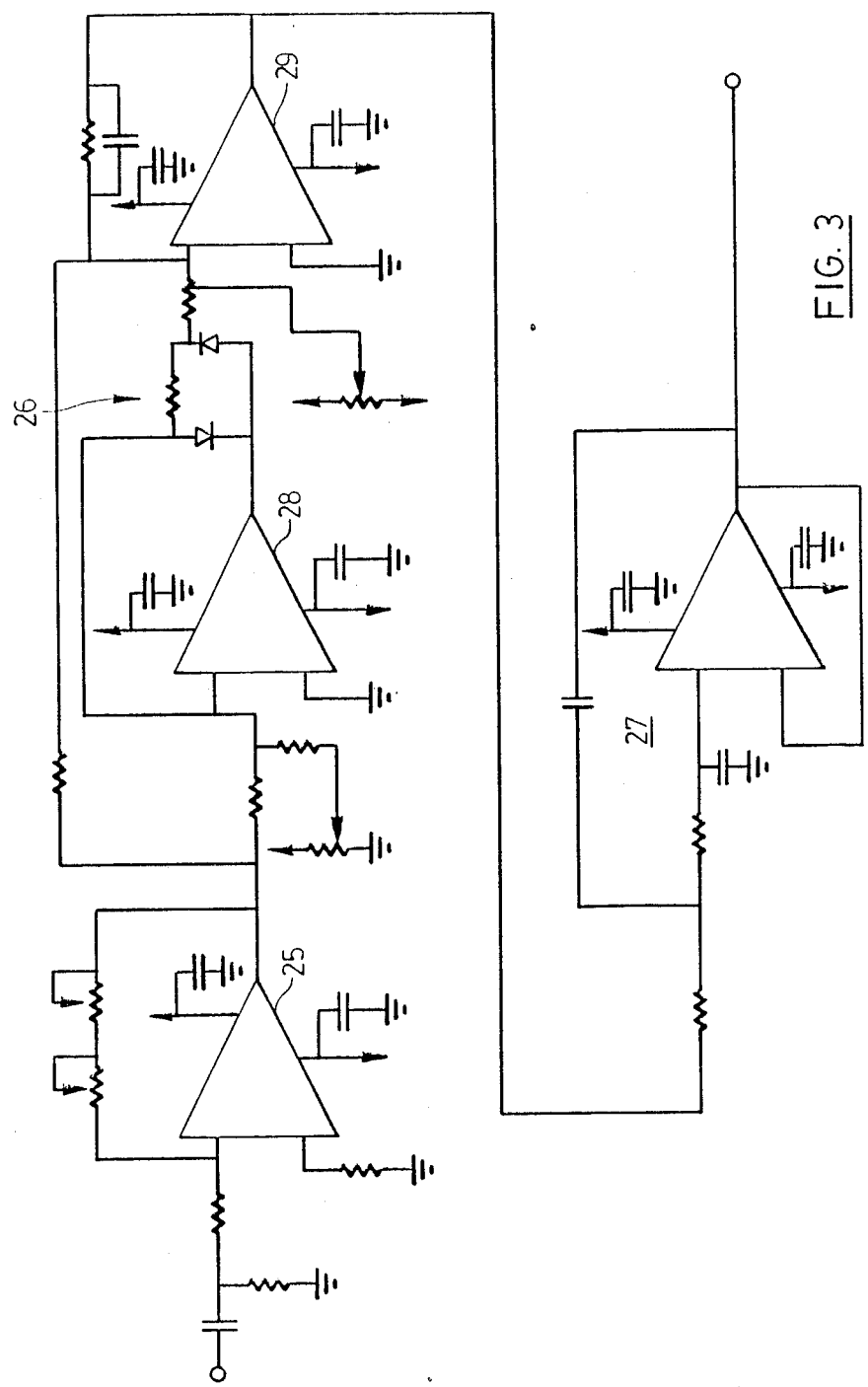
FIG. 3 is a wiring diagram of the wideband sonar detection module represented in FIG. 2.

Referring to FIG. 3, the input amplifier 25 of the module 24 preferably has a bandwidth of at least 1.2 MHz, in which case it will accommodate sonar frequencies of 420 kHz and lower, but in any event must have a bandwidth of at least 500 kHz. The amplifier 25 has a typical gain of 20 dB. The output of the amplifier is applied to the input of the full wave detector 26, consisting of two integrated circuits 28, 29 connected in circuit as shown so as to incorporate a 50 kHz filter for the detected signal. The output of the detector 26 is applied to the filter 27, which is an active low pass filter having a cut off frequency of 50 kHz.

In order to compare the performance of the modified equipment with the conventional equipment, experiments were conducted in the tank shown in FIG. 4. The tank measured approximately 15 m wide, 15 m long, and 1.5 m deep. The tank 30 was made semi-anechoic by constructing a perimeter wall 31 of 25 cm. concrete blocks approximately 1 meter inside the tank. The dual beam transducer 10 of each equipment was placed at one end of the tank, and information on targets was obtained generally within 3-9 meters from the transducer. In experiments involving fish a net was used to maintain the fish within the acoustic beam. An underwater camera 32 and an overhead camera 33 were used to obtain visual records of the positions of the targets.

Experiments focussed on the capabilities of the conventional equipment (FIG. 1) and the modified equipment (FIG. 2) to provide information allowing recognition of various geometric shapes and different fish species. The various targets used in the experiments are listed in Table 1.

TABLE I

| Shape | Size (cm.) |
|---|---|
| ping pong ball (air) | 3.7 diameter |
| ping pong ball (filled with water) | 3.7 diameter |
| multiple ping pong balls (air) | 3.7 diameter |
| wood ball | 3.2 diameter |
| steel ball | 2.5 diameter+ |

TABLE I-continued

| Shape | Size (cm.) |
|---|---|
| styrofoam ball | |
| #1 | 14.5 diameter |
| #2 | 9.8 diameter |
| #3 | 7.4 diameter |
| #4 | 4.8 diameter |
| #5 | 3.6 diameter |
| styrofoam egg | 11.6 length |
| | 8.4 height |
| wood rod | |
| #1 | 3.3 diameter |
| #2 | 1.9 diameter |
| #3 | 1.2 diameter |
| bark chip | irregular |
| leaf (excluding stem) | 13.0 high × 17.8 wide |
| air bubbles | |
| (small) | 1 mm |
| (large) | 5 mm |
| sturgeon | (variable) |
| #1 | 32 total length |
| #2 | 42 total length |
| #3 | 50 total length |
| #4 | 60 total length |
| #5 | 70 total length |
| #6 | 80 total length |
| multiple sturgeon | 32-80 total length |

Experiments involved both single and multiple targets. Single targets included a ping pong ball, a steel ball, a styrofoam ball, air bubbles, a leaf and other shapes. Some shapes were similar in diameter (e.g. ping pong ball with and without water, styrofoam ball #5), while others were not (e.g. air bubble wand, leaf). The intent here was to determine whether the equipment could show differences, at least qualitatively, in the reflected signals of various targets. Data collected on sturgeon (*Acipenser fluvescens*) and walleye (*Stizostedion vitreum*) were recorded from individual tranquilized (MS222) fish suspended approximately 6 m from the transducer using monofilament. The monofilament line did not appear to be detected using the 420 kHz transducer. The reflected signals of fish positioned both laterally, frontally and at 45 degrees to the transducer were recorded.

Multiple target experiments were conducted using only ping pong balls and live fish. Three balls each approximately 10-15 cm. apart, were placed 3, 5, 8 and 9 m from the transducer (i.e. a total of 12 targets). In the sturgeon and Walleye tests, 15 to 20 different sized fish were released in the tank and were allowed to swim randomly throughout the caged area.

Both single and multiple target experiments involved transmitted pulse widths of 0.5 ms and 0.1 ms which theoretically corresponded to spatial resolutions of targets at 37.5 and 7.5 cm., respectively. In these preliminary experiments, comparisons were made of the reflected signals between the two methods expressed as both time domain plots and power spectra (fast fourier transformation of FFT's). Taped time domain signals for both transmitted pulse widths (using the 6 degree transducer) were plotted off either Racal or DAT recorders using a HP 7460A plotter. The plot for each target was based on only one signal, and was assumed to be representable of signals during the experimental period. For each recorded target, mean pulse width (at −6 dB level) was estimated based on 150 or more signals using the ESP. Peak amplitude levels were also estimated (at 0 dB level) using the ESP. Typical power spectra were constructed from the recorded signals using a Nicolet 660B analyzer.

In addition to time domain and power frequency statistics, information was obtained on the reflecting power of each target (geometric shape or fish) or the target's backscattering cross section. The dual beam transducer 10 was used to estimate target: strength since it could correct for the target being off-axis. For dual beam processing (ESP), the echoes were received on both the 6 and 15 degree elements. The signals were amplified using a time varied gain amplifier and analyzed. Target strengths were estimated for most shapes approximately 3.1 m from the transducer which was expected to be in a "free-field" measurement zone. Target strengths of sturgeon, walleye and other species were also estimated for both individuals and groups. Comparisons were made of the estimated target strengths of the ping pong balls using both the existing and modified sounder with a 0.5 ms transmitted pulse.

The results of the experiments will now be discussed with reference to FIGS. 5-37. Each of FIGS. 5-27 consists of four diagrams showing comparative results obtained using the two equipments, and wherein:

FIGS. 5a-27a show results obtained with the known equipment using transmitted pulses at 0.5 ms pulse width;

FIGS. 5b-27b show results obtained with the new equipment using transmitted pulses at 0.5 ms pulse width;

FIGS. 5c-27c show results obtained with the known equipment using transmitted pulses at 0.1 ms pulse width; and FIGS. 5d-27d show results obtained with the new equipment using transmitted pulses at 0.1 ms pulse width.

Soatial Resolution

FIGS. 5a-5d show the results obtained from experiments involving four sets of three ping pong balls, the sets being spaced approximately 10-15 cm apart at various distances from the transducers. The experiments were conducted at transmitted pulse widths of 0.1 ms and 0.5 ms, which theoretically correspond to spatial resolutions of approximately 7.5 cm. and 37.5 cm. respectively.

Figure 5A:
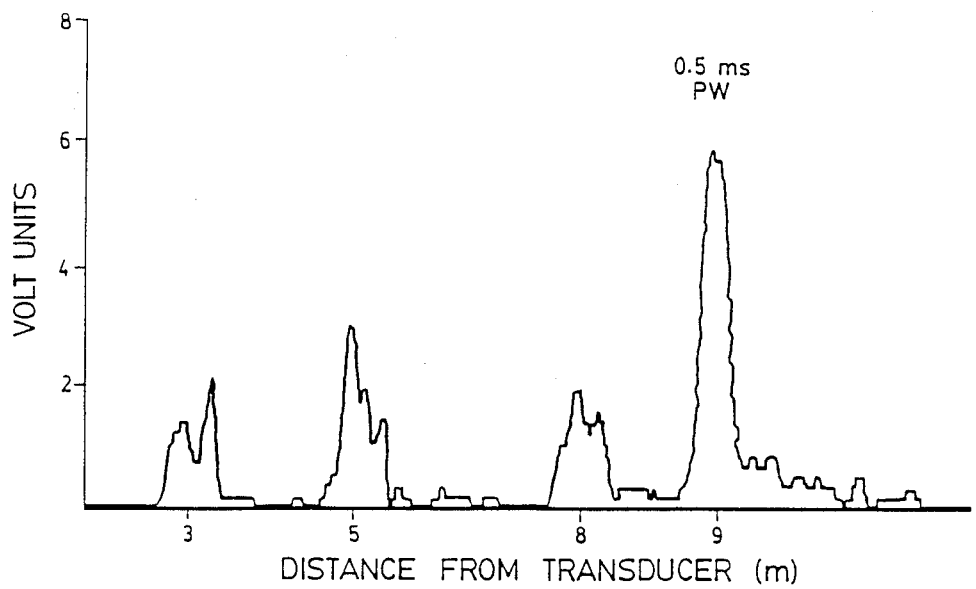
Figure 5B:
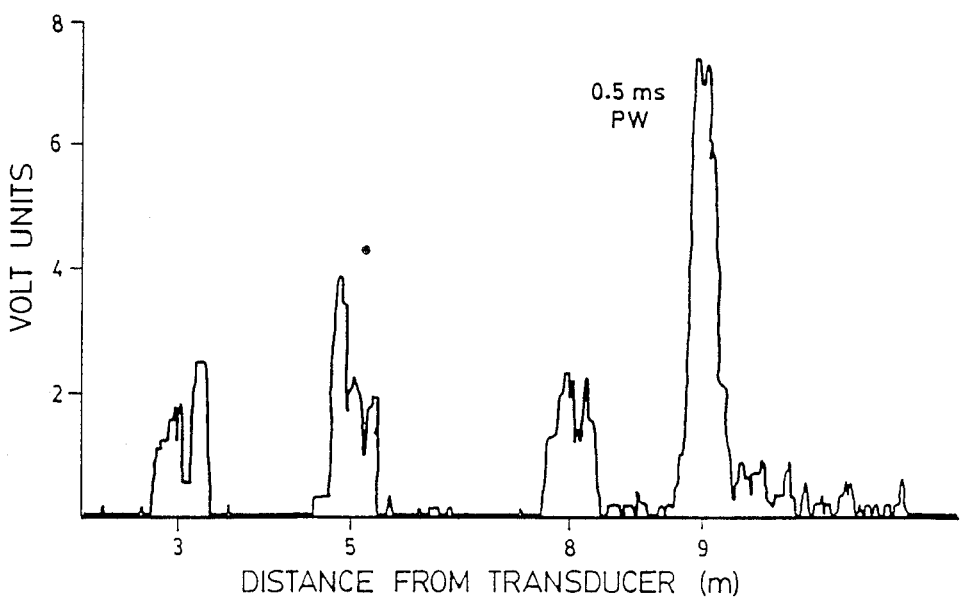
Figure 5C:
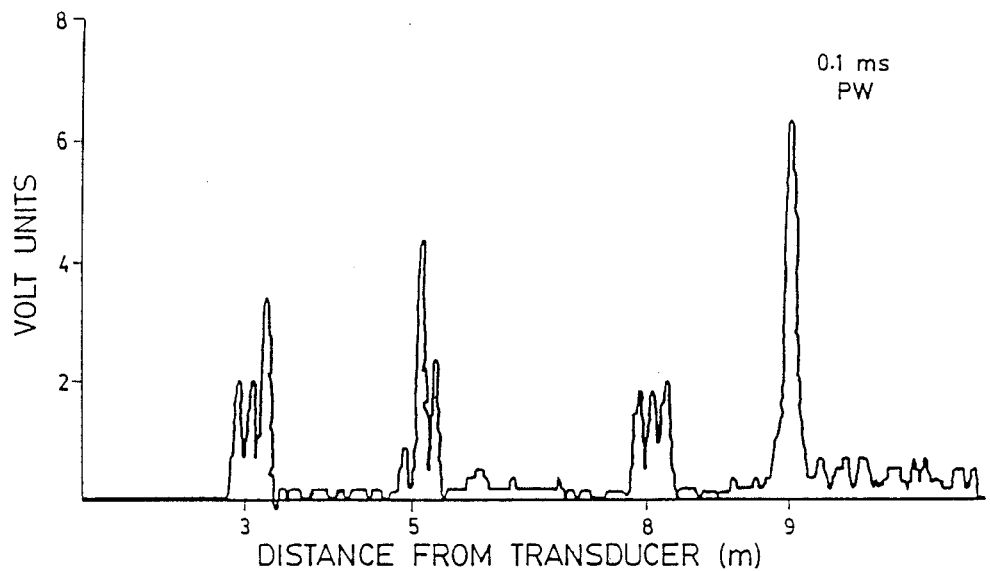
Figure 5D:
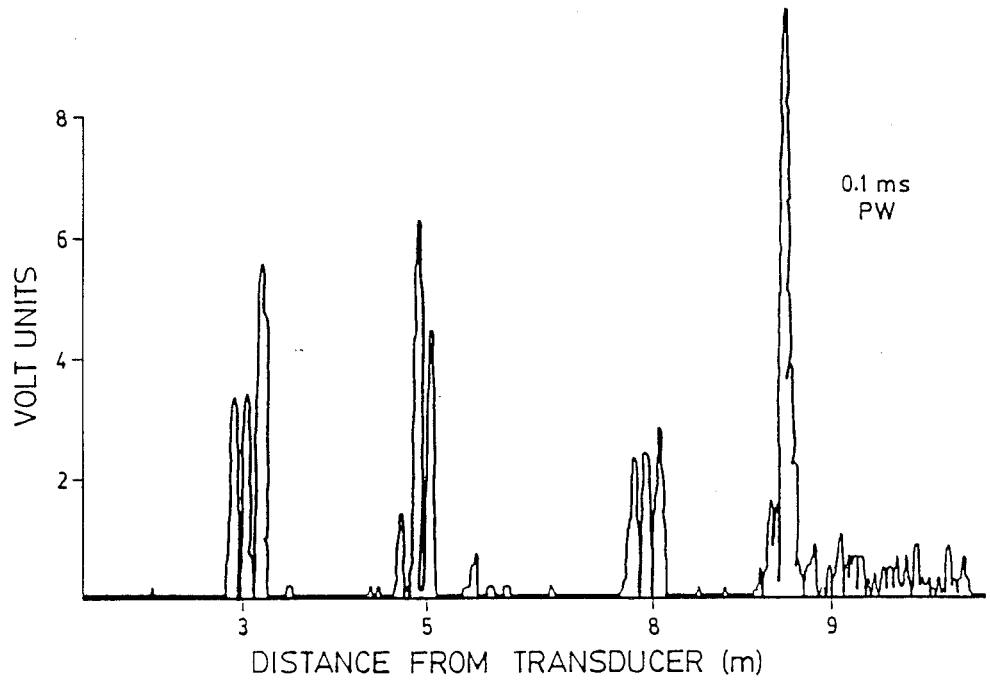
Figure 6A:
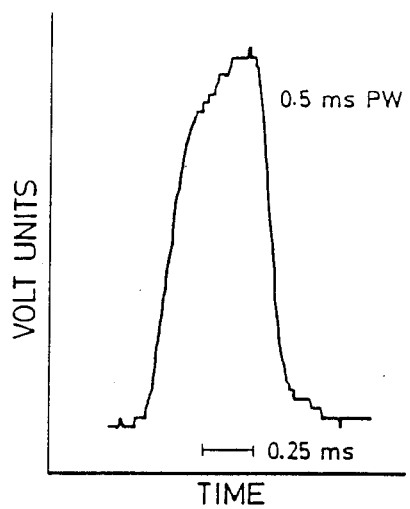
Figure 6C:
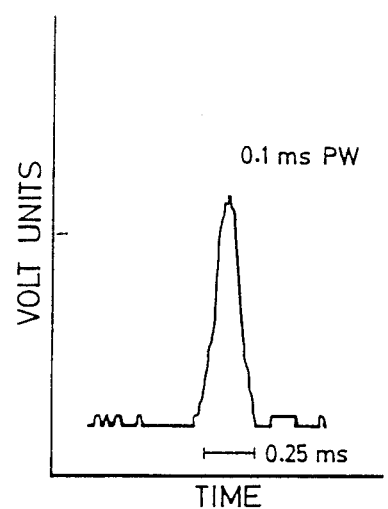
Figure 6B:
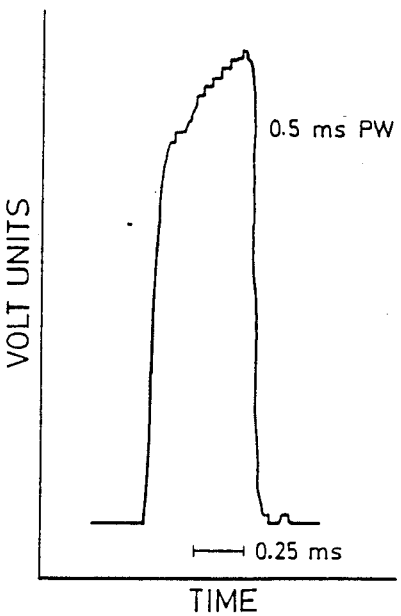
Figure 6D:
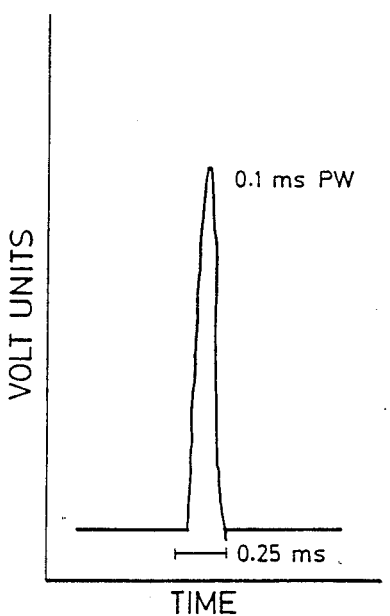
Figure 7A:
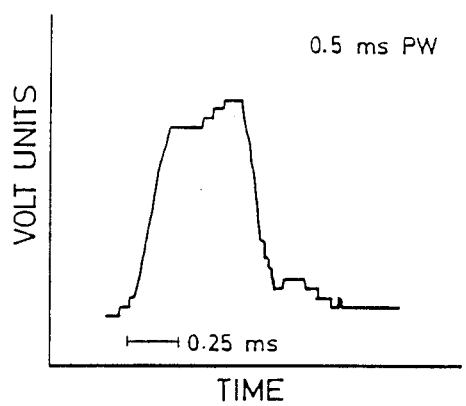
Figure 7C:
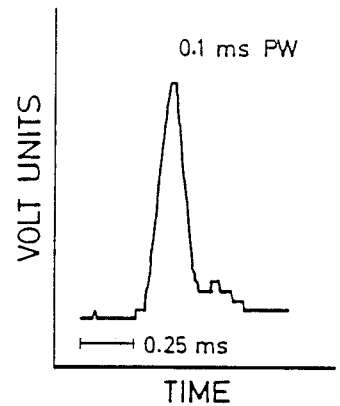
Figure 7B:
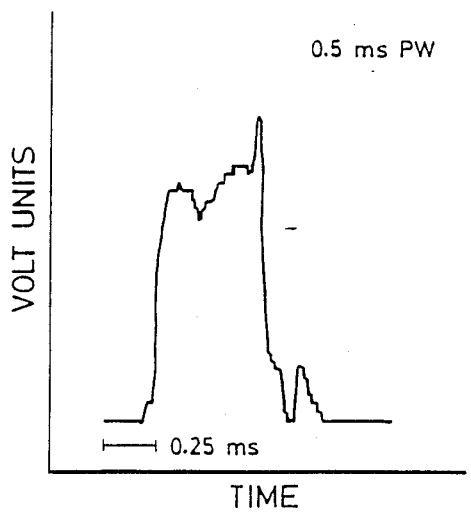
Figure 7D:
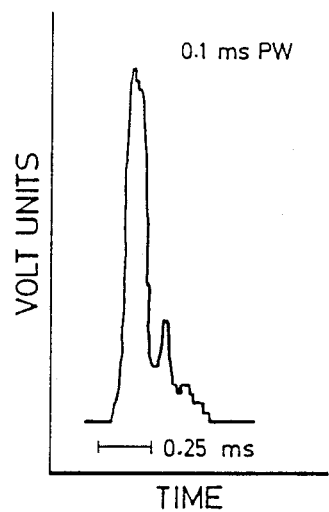
Figure 8A:
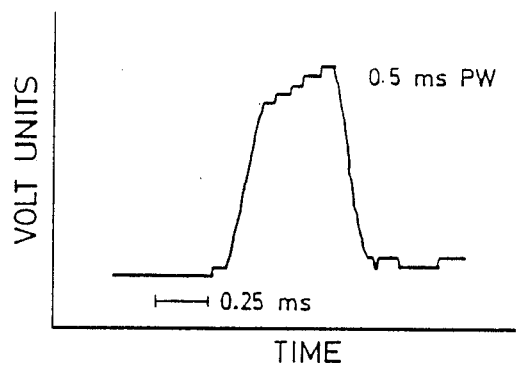
Figure 8C:
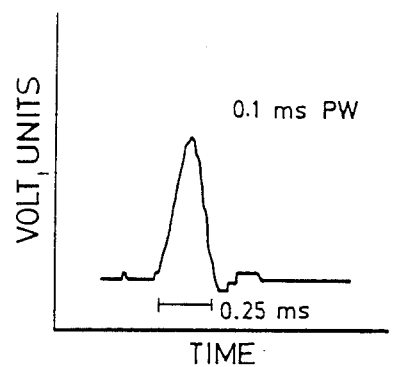
Figure 8B:
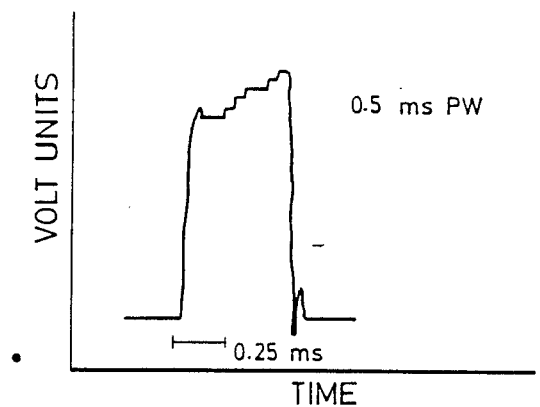
Figure 8D:
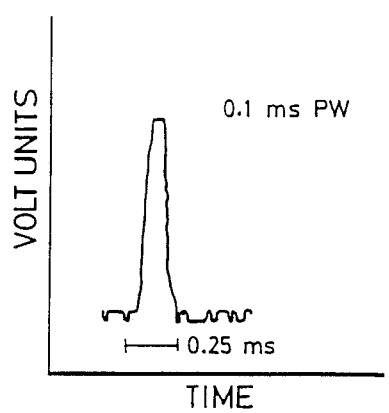
Figure 9A:
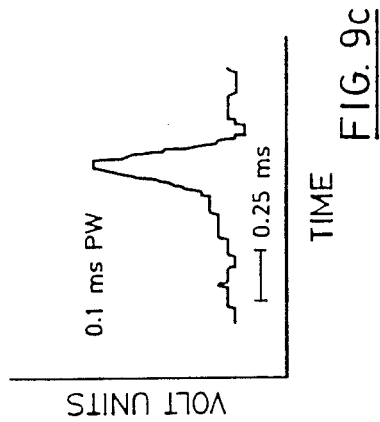
Figure 9C:
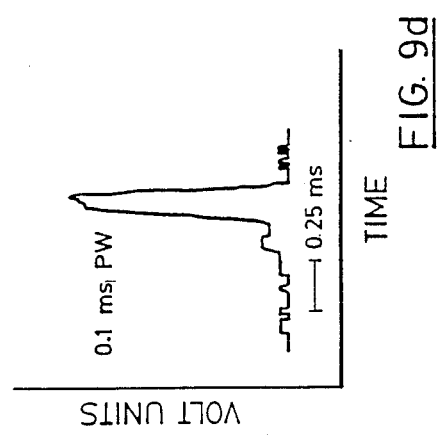
Figure 9B:
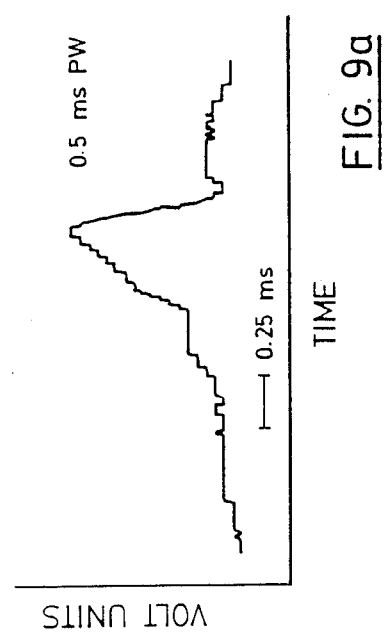
Figure 9D:
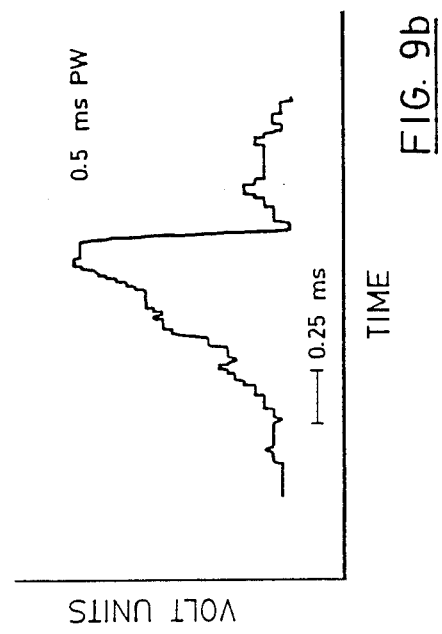
Figure 10A:
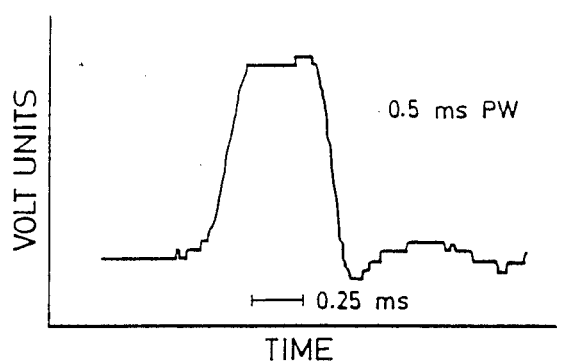
Figure 10C:
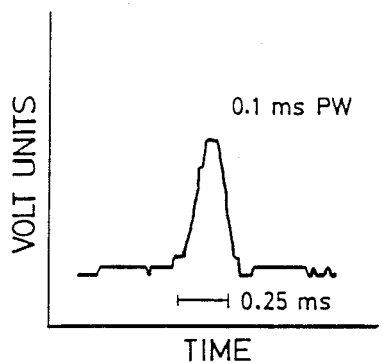
Figure 10B:
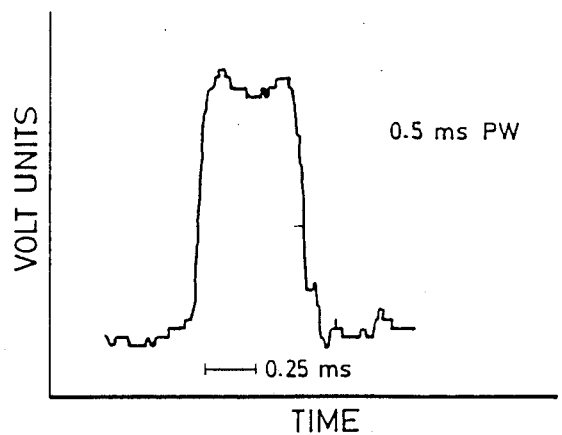
Figure 10D:
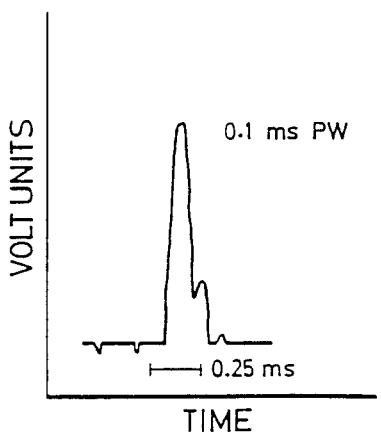
Figure 11A:
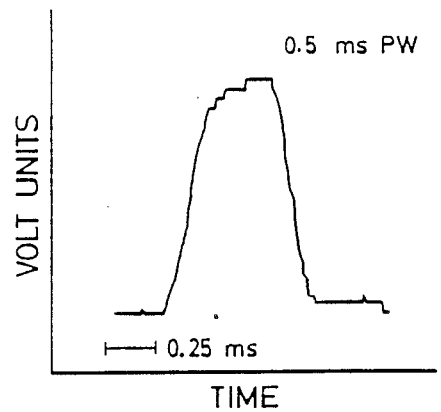
Figure 11C:
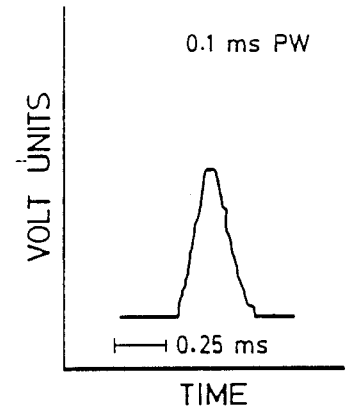
Figure 11B:
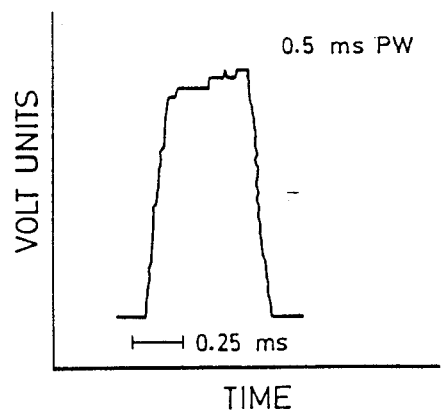
Figure 11D:
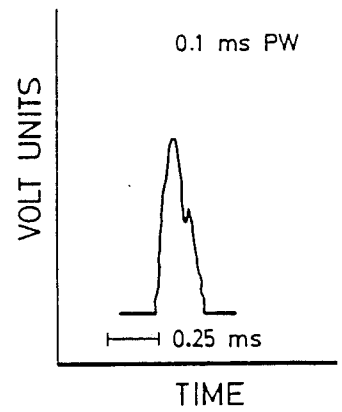
Figure 13A:
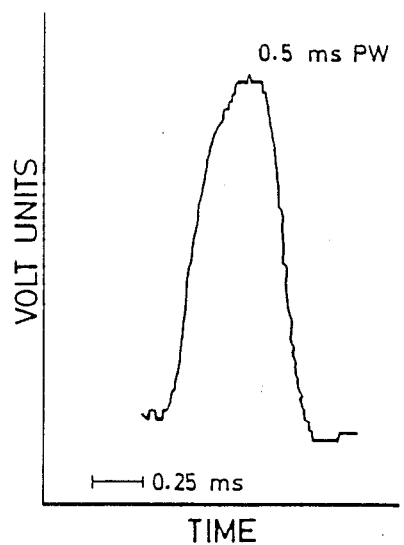
Figure 13C:
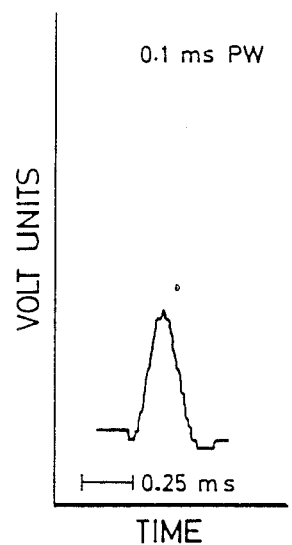
Figure 13B:
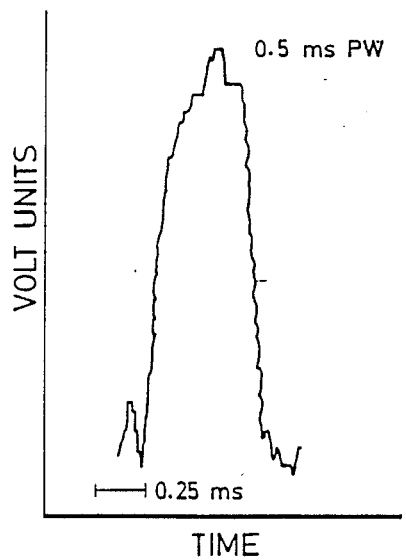
Figure 13D:
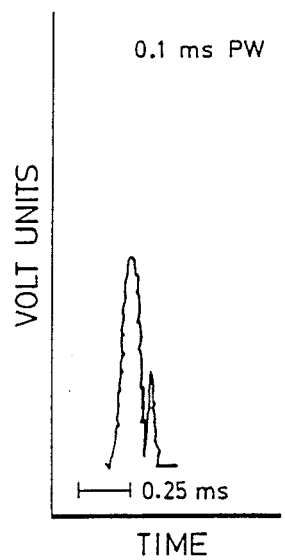
Figure 14A:
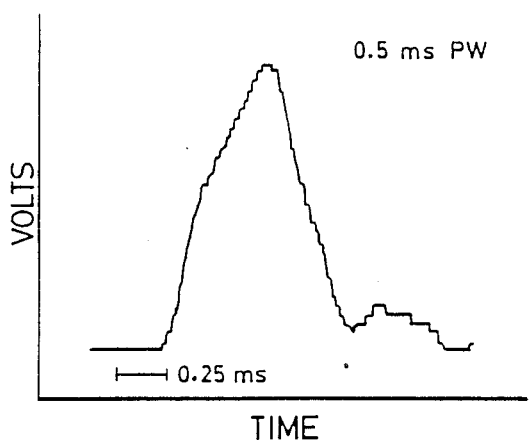
Figure 14C:
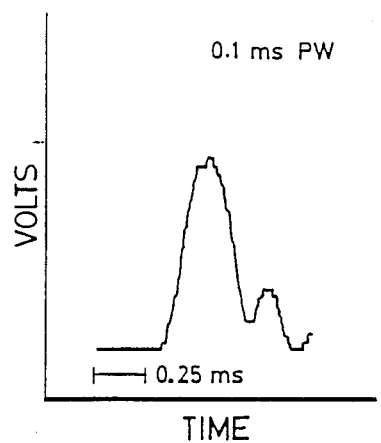
Figure 14B:
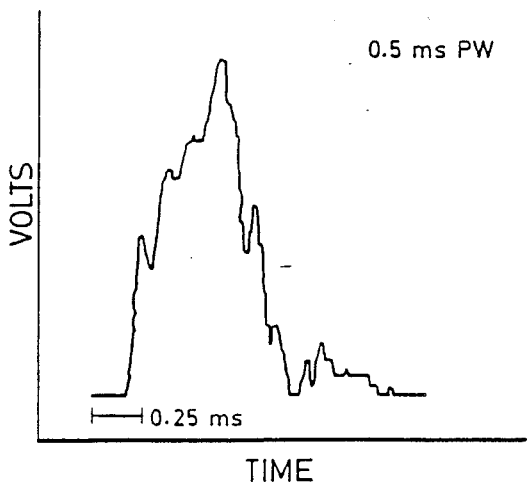
Figure 14D:
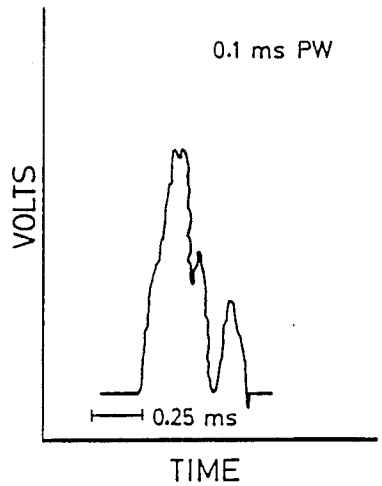
Figure 15A:
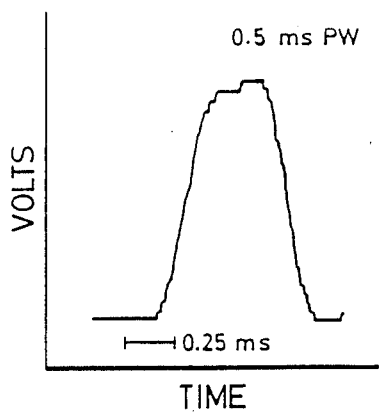
Figure 15C:
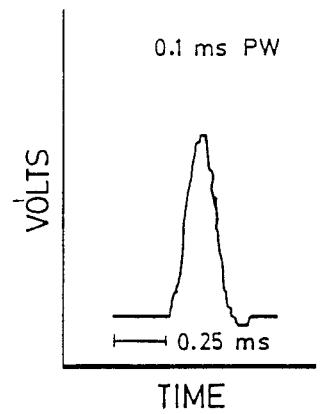
Figure 15B:
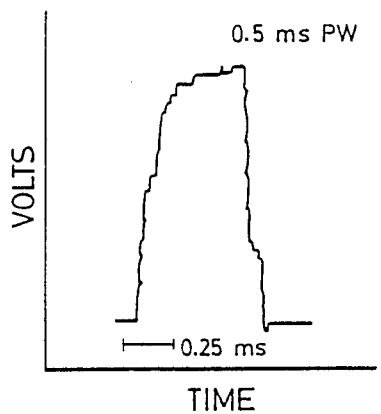
Figure 15D:
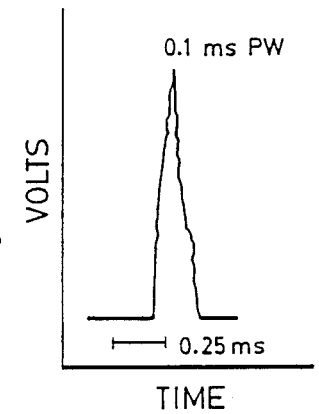
Figure 16A:
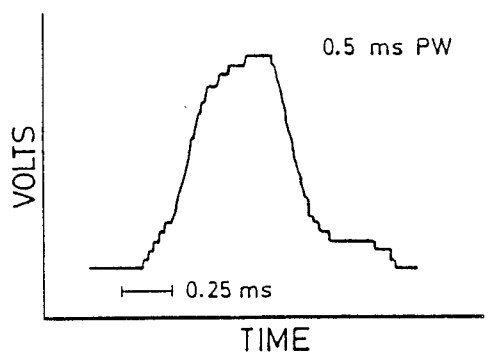
Figure 16C:
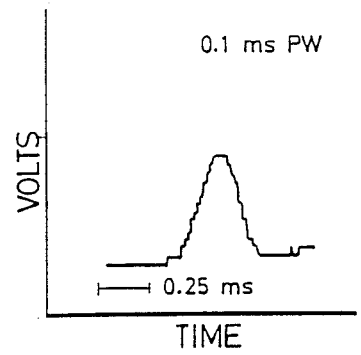
Figure 16B:
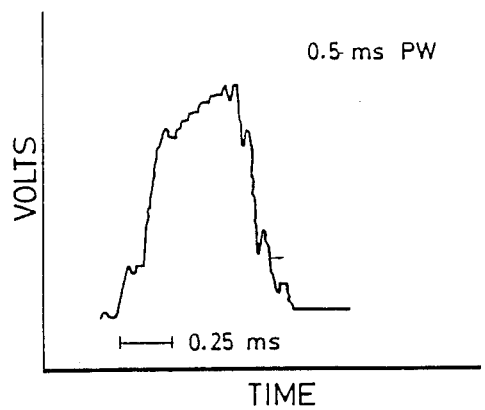
Figure 16D:
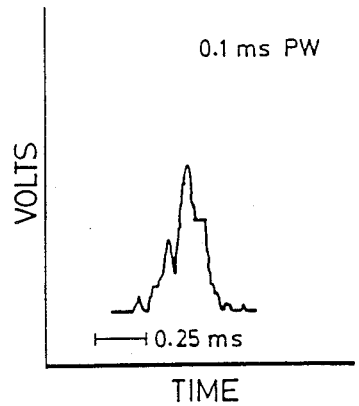
Figure 17A:
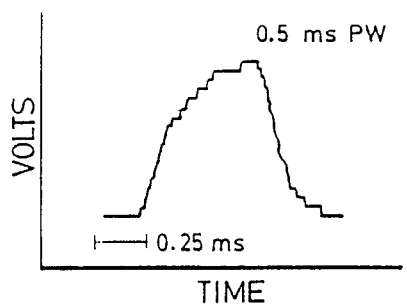
Figure 17C:
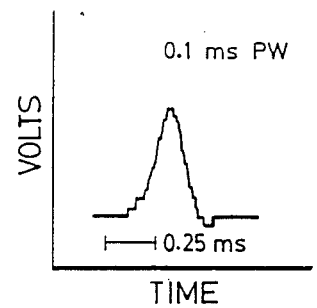
Figure 17B:
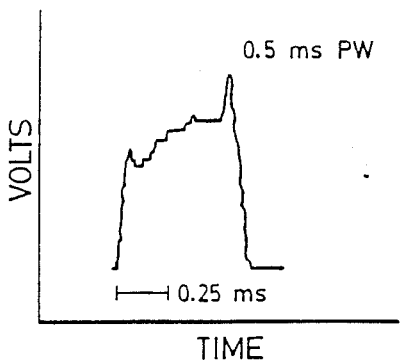
Figure 17D:
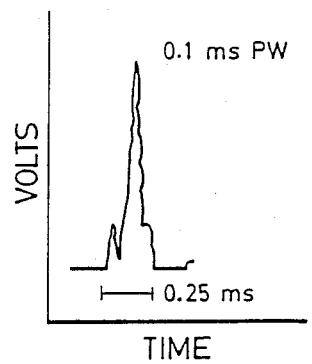
Figure 18A:
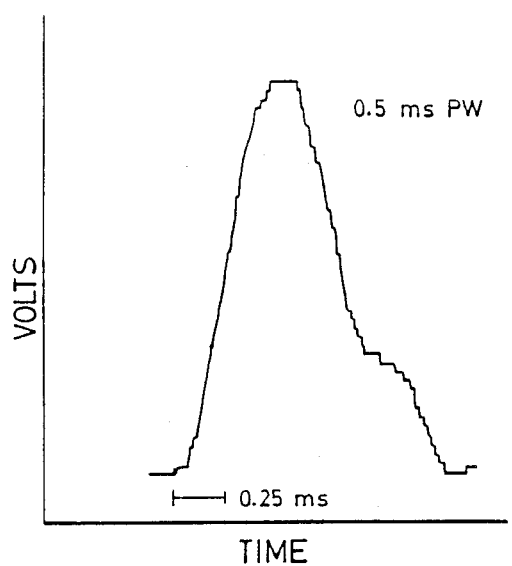
Figure 18C:
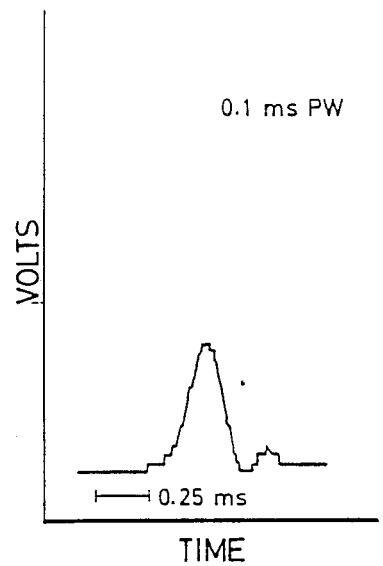
Figure 18B:
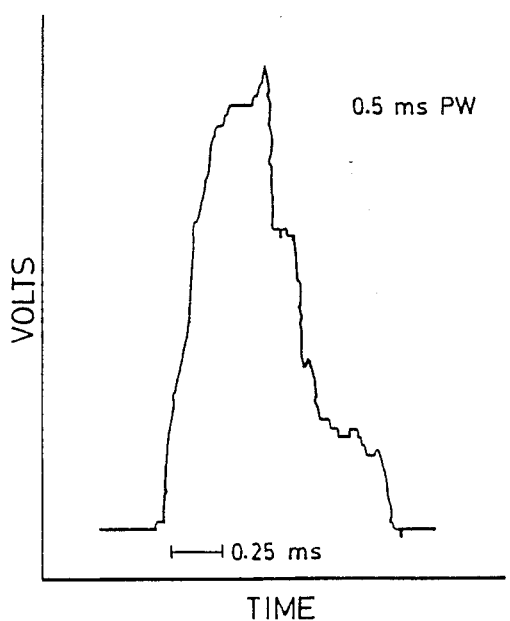
Figure 18D:
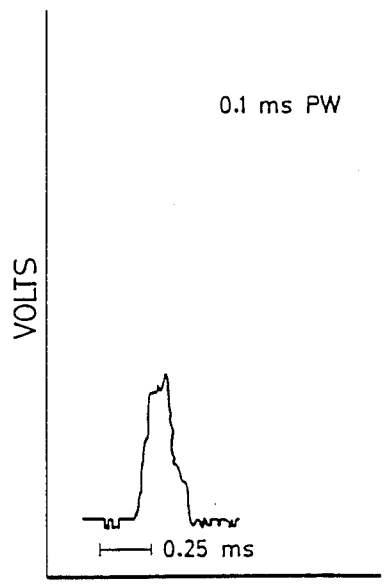
Figure 19A:
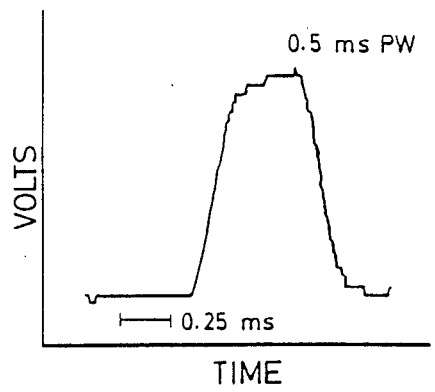
Figure 19C:
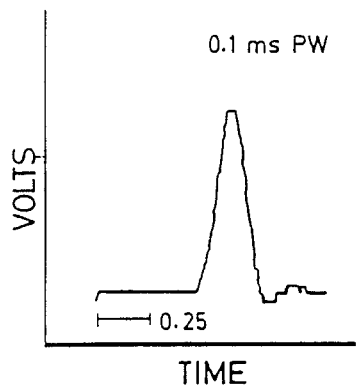
Figure 19B:
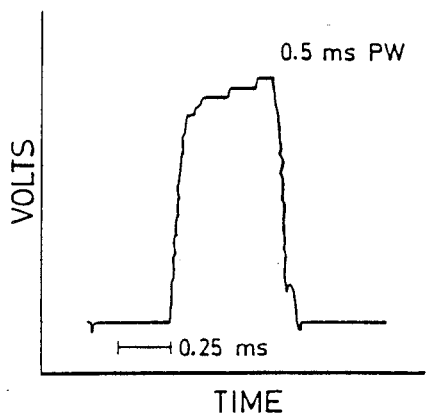
Figure 19D:
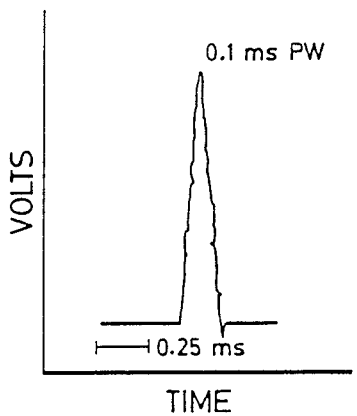
Figure 20A:
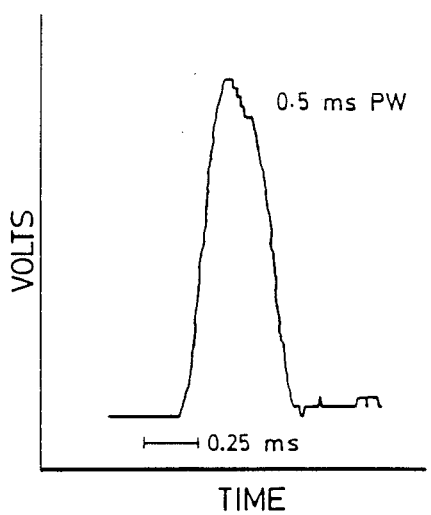
Figure 20C:
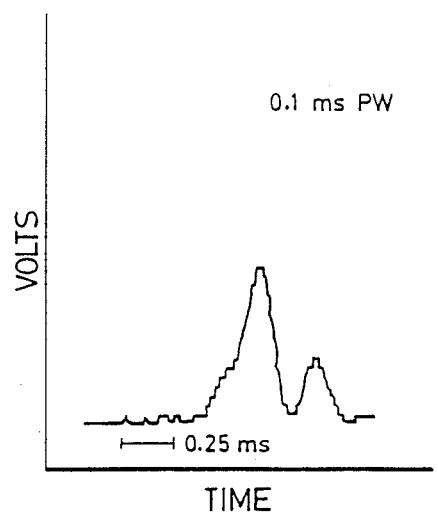
Figure 20B:
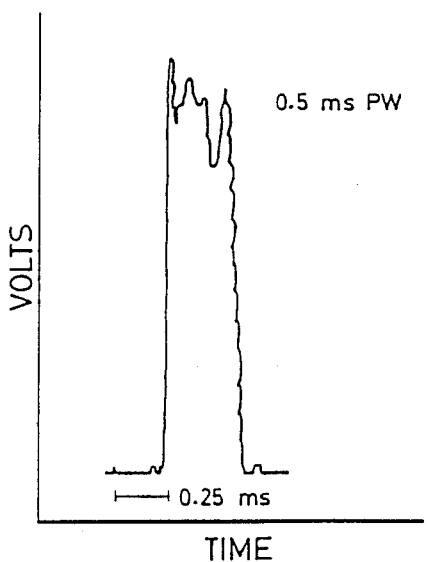
Figure 20D:
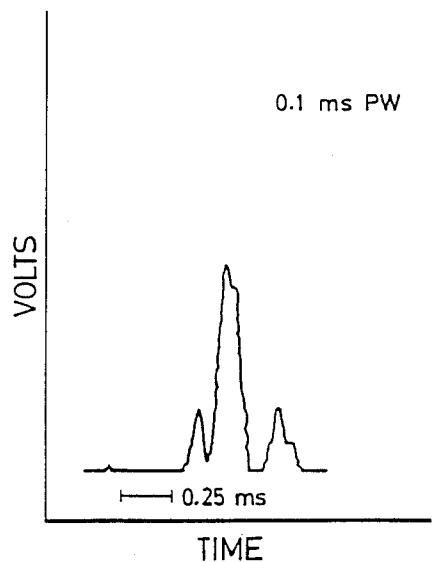
Figure 21A:
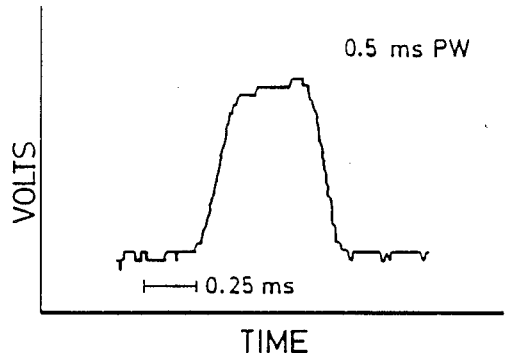
Figure 21C:
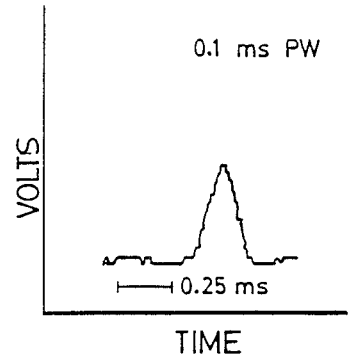
Figure 21B:
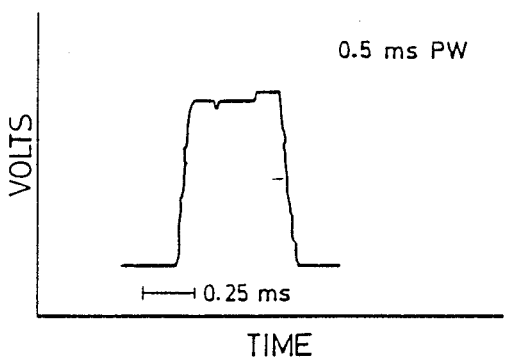
Figure 21D:
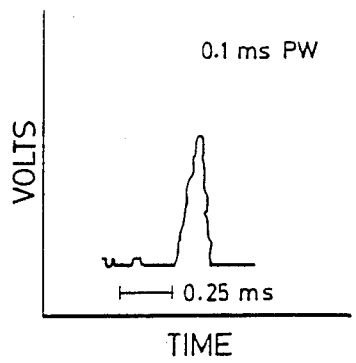
Figure 22A:
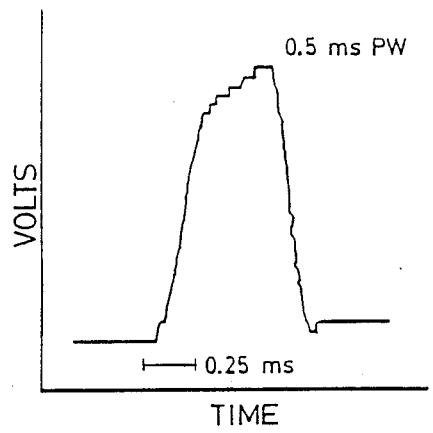
Figure 22C:
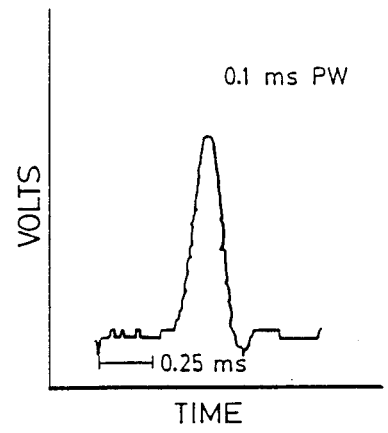
Figure 22B:
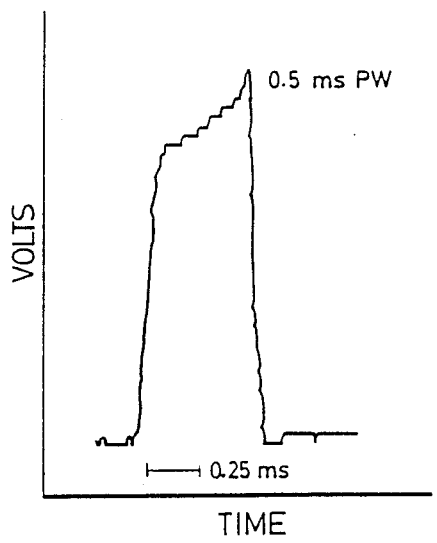
Figure 22D:
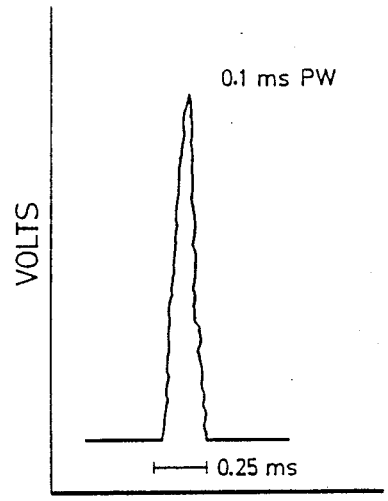
Figure 23A:
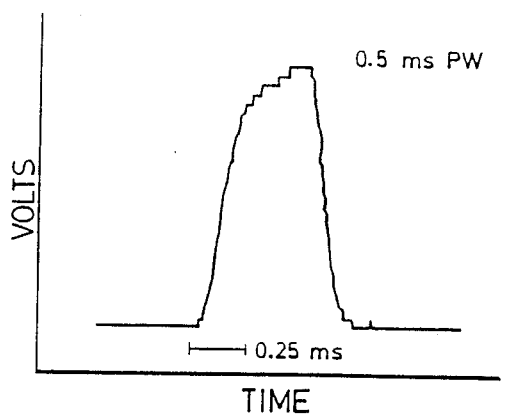
Figure 23C:
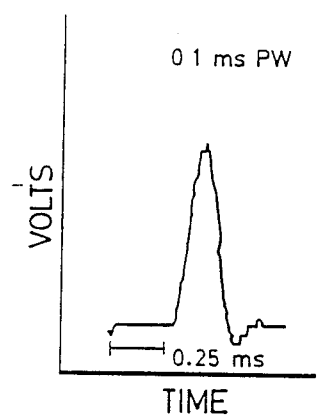
Figure 23B:
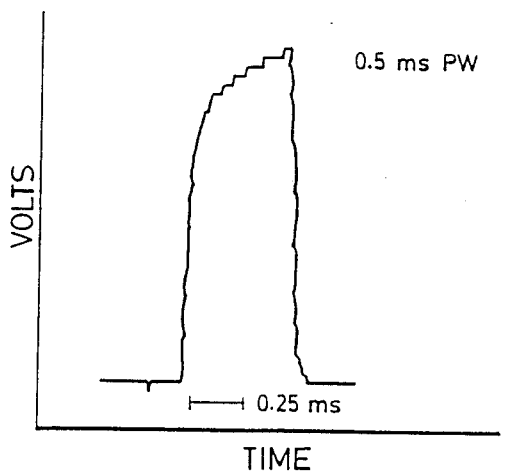
Figure 23D:
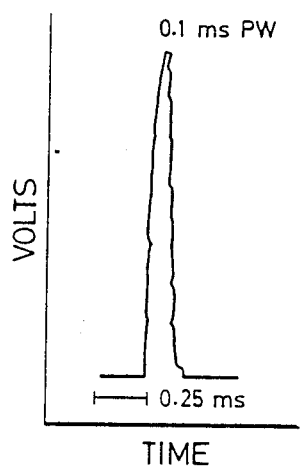
Figure 24A:
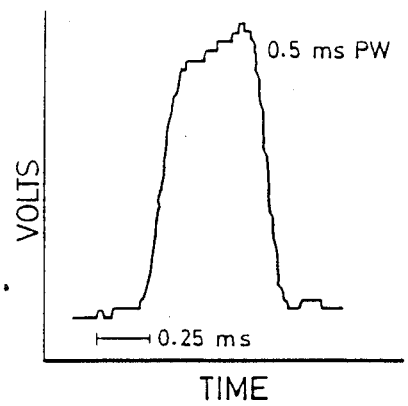
Figure 24C:
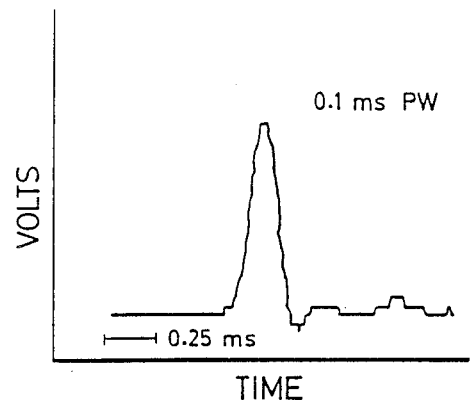
Figure 24B:
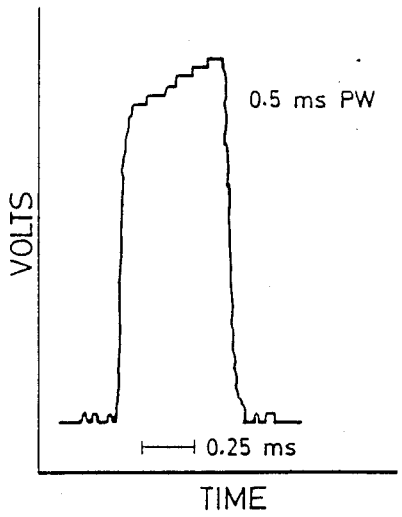
Figure 24D:
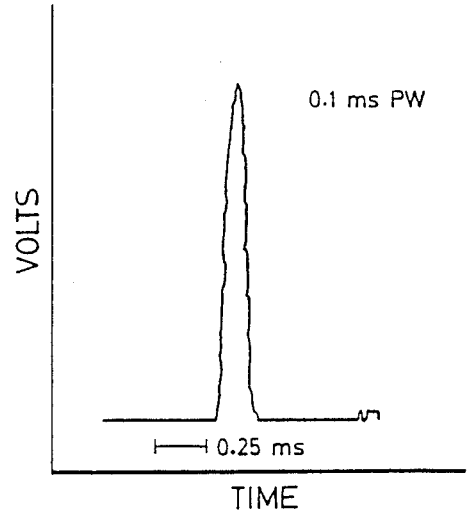
Figure 25A:
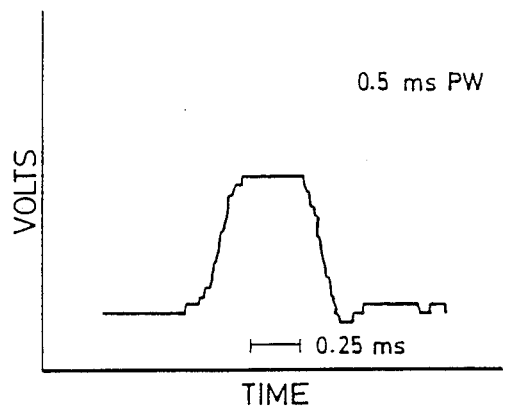
Figure 25C:
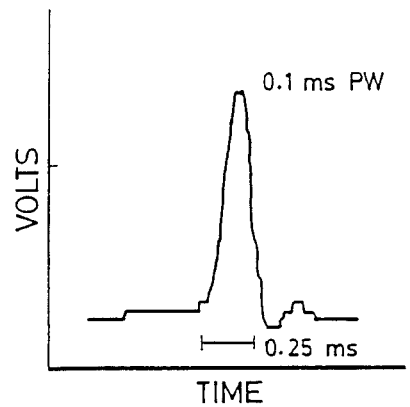
Figure 25B:
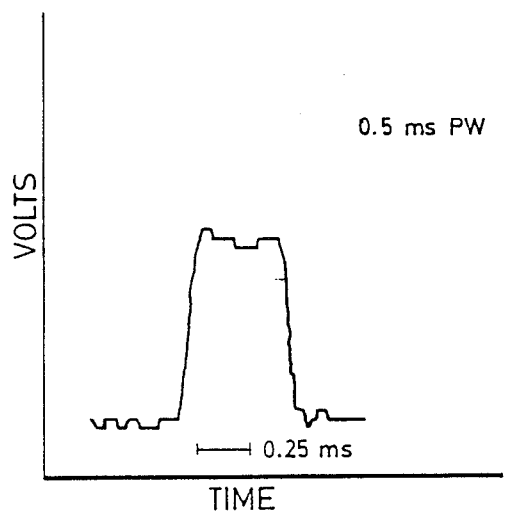
Figure 25D:
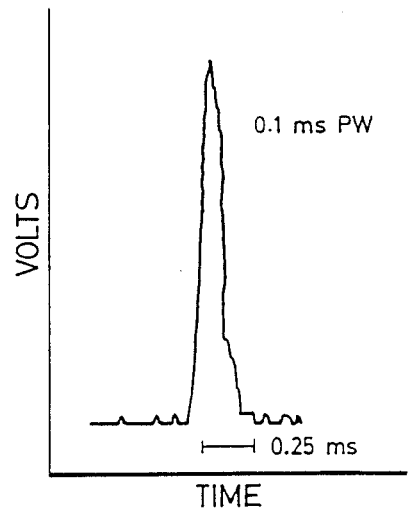
Figure 26A:
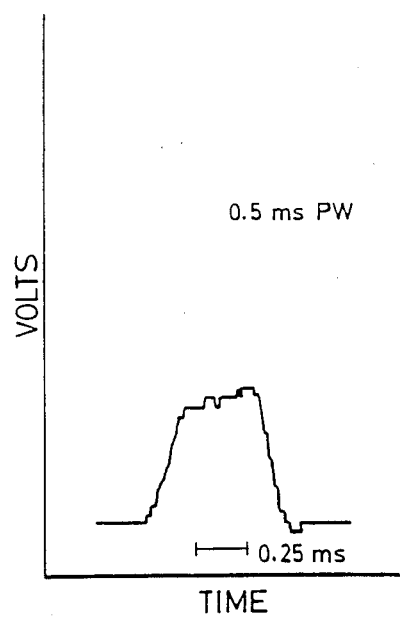
Figure 26C:
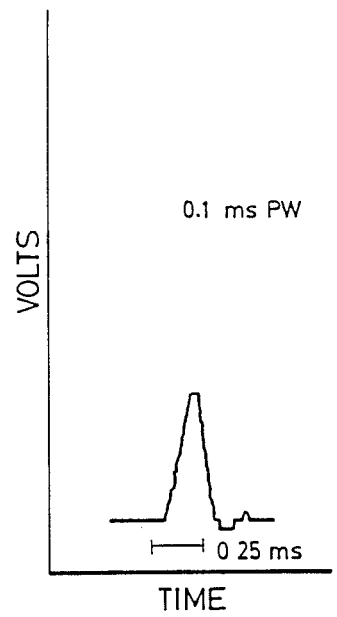
Figure 26B:
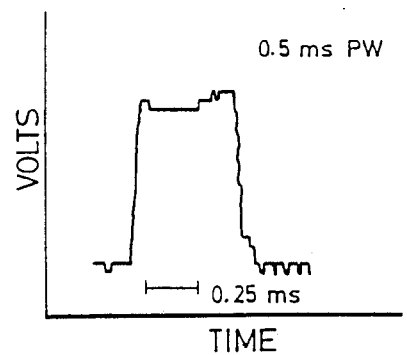
Figure 26D:
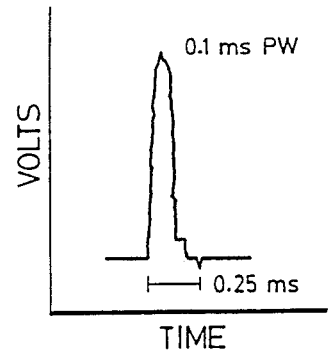
Figure 27A:
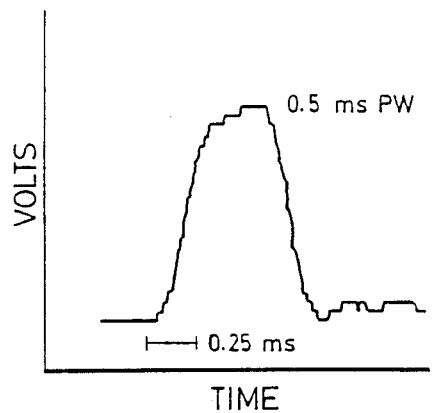
Figure 27C:
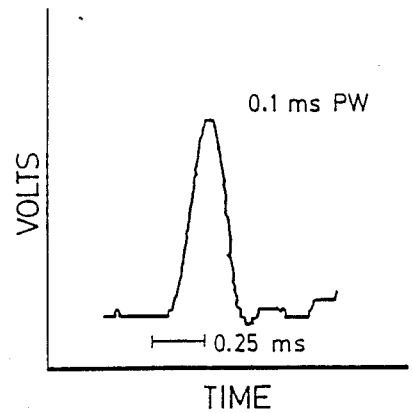
Figure 27B:
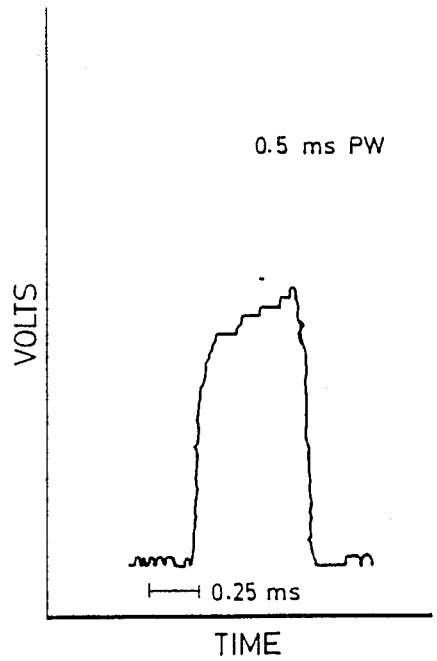
Figure 27D:
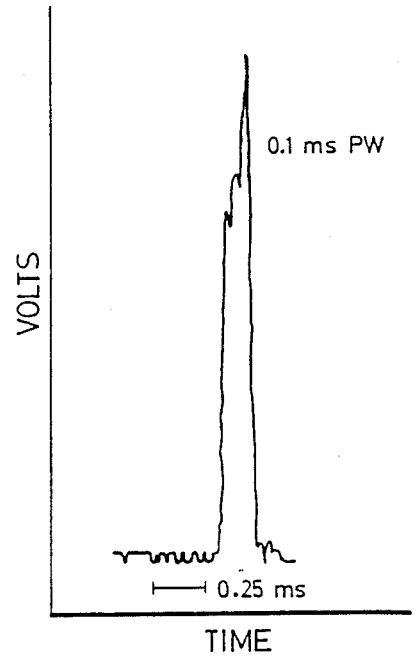

By comparing FIGS. 5a and 5c with FIGS. 5b and 5d one can readily see that the new equipment of the present invention gives much better resolution of targets, more particularly at the lower pulse width of 0.1 ms. This can be attributed to the fact that the wideband system of the present invention can recognize the higher fourier components of the received pulses.

Backscattering Curves—Time Domain Plots

FIGS. 6-10 show comparative results obtained using the two equipments, operating at the two transmitted pulse widths 0.5 ms and 0.1 ms as previously discussed. The curves shown in the diagrams are time domain plots of selected single targets, namely, a ping pong ball (FIG. 6), a ping pong ball filled with water (FIG. 7), a styrofoam ball (FIG. 8), a leaf (FIG. 9) and air bubbles (FIG. 10). As would be expected, the plots are obtained for both equipments at 0.5 ms pulse width are better defined than those obtained at 0.1 ms pulse width. More significantly, however, the signals obtained using the equipment of the present invention differ from those obtained using the known equipment. In particular, the rise times are considerably sharper for all targets than those obtained using the known equipment. Furthermore, the signals obtained using the new equipment are better defined —see particularly FIGS. 7-10.

In the same way, the performances of the two equipments were compared using other targets, including sturgeon oriented in three different aspects. FIGS. 11-27, each consisting of four diagrams, show the respective time domain plots for comparison.

Each of FIGS. 11-27 relates to a specific target, which is identified in Table 2.

TABLE 2

| FIG. | Target |
|------|--------|
| 11 | Sturgeon, 80 cm. long, lateral aspect |
| 12 | Sturgeon, 80 cm. long, 45° aspect |
| 13 | Sturgeon, 80 cm. long, frontal aspect |
| 14 | Sturgeon, 70 cm. long, frontal aspect |
| 15 | Sturgeon, 70 cm. long, lateral aspect |
| 16 | Sturgeon, 60 cm. long, frontal aspect |
| 17 | Sturgeon, 60 cm. long, lateral aspect |
| 18 | Sturgeon, 50 cm. long, frontal aspect |
| 19 | Sturgeon, 50 cm. long, lateral aspect |
| 20 | Sturgeon, 42 cm. long, lateral aspect |
| 21 | Sturgeon, 42 cm. long, lateral aspect |
| 22 | Styrofoam Egg |
| 23 | Small Wood Rod |
| 24 | Bark |
| 25 | Air Bubbles |
| 26 | Wood Rod |
| 27 | Steel Ball |

The comparative results illustrated in FIGS. 11-27 clearly show the better definition of targets using the new equipment of 0.5 ms pulse width (FIGS. 11b-27b) and at 0.1 ms. (FIGS. 11d-27d) as compared with the known equipment (FIGS. 11a-27a and FIGS. 11c-27c). The better definition can be attributed to the fact that high fourier components of the received pulses are largely conserved with the new equipment, which offers the possibility of identifying targets so that it may be used to speciate fish and to distinguish fish from debris.

Backscattering—Power Spectrum Plots

Typical power spectrum plots for a variety of targets, using both the new and the known equipments are illustrated in FIGS. 28-37.

Figure 28:
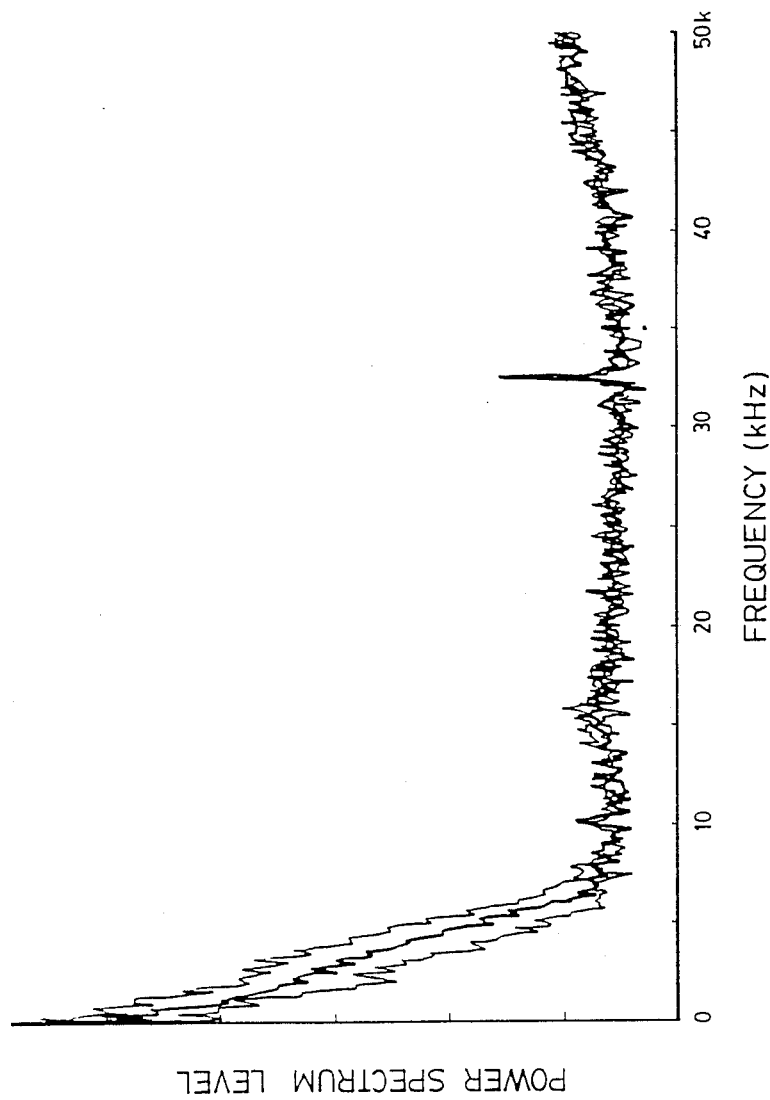
Figure 29:
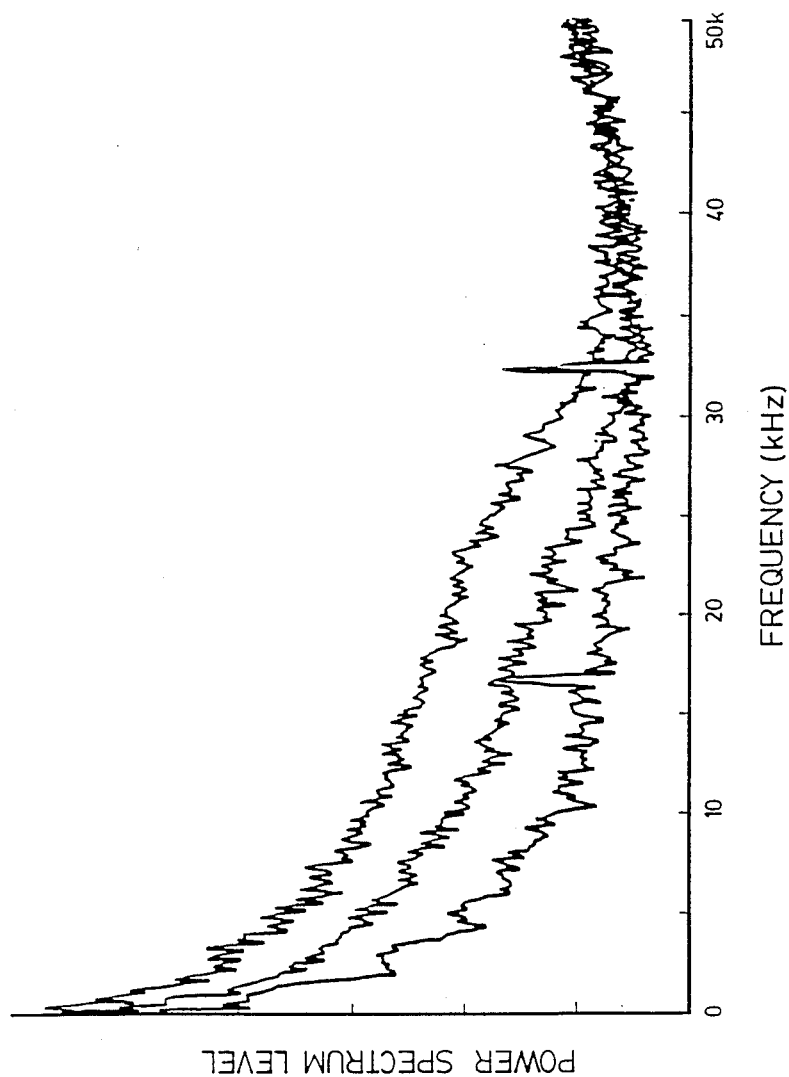

FIG. 28 shows power spectrum plots, using the known equipment, for sturgeon 80 cm. long oriented in three different aspects FIG. 29 shows the plots obtained with the same targets using the equipment of the present invention. It will be noted that the new equipment can more readily differentiate between the fish orientations.

Figure 30:
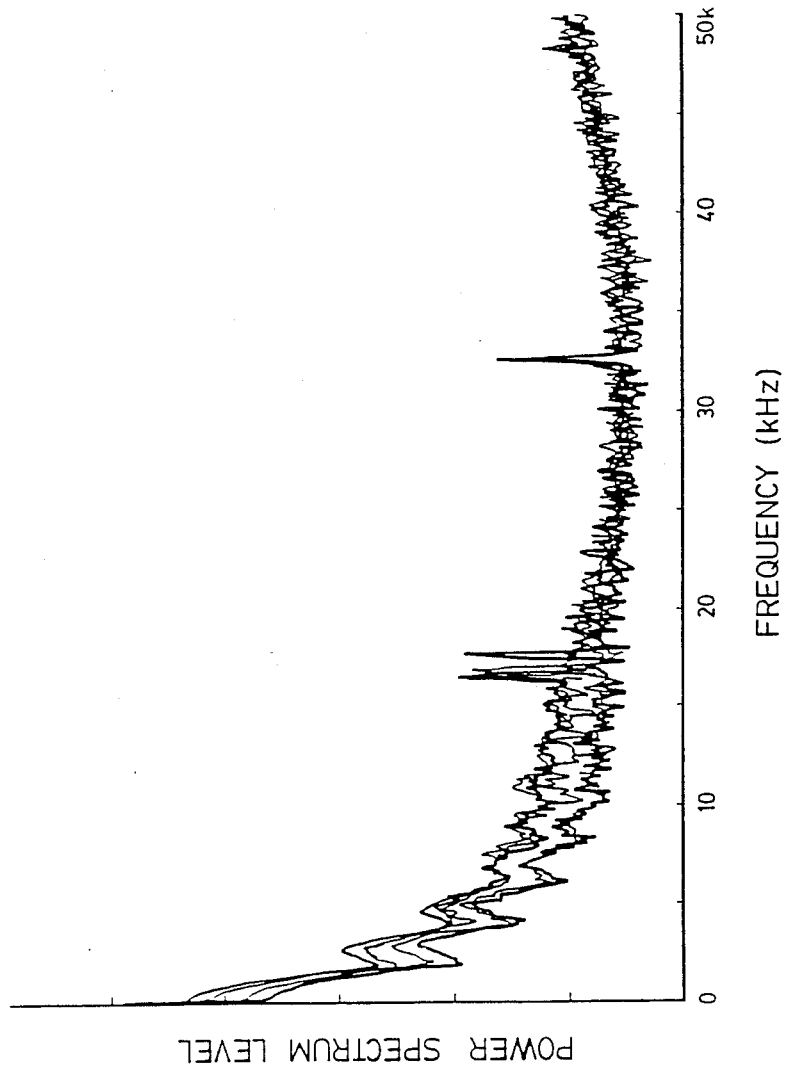

FIG. 30 shows power spectrum plots, using the new equipment, for various sizes of sturgeon, 42 cm., 50 cm., 60 cm., 70 cm., and 80 cm.

Figure 31:
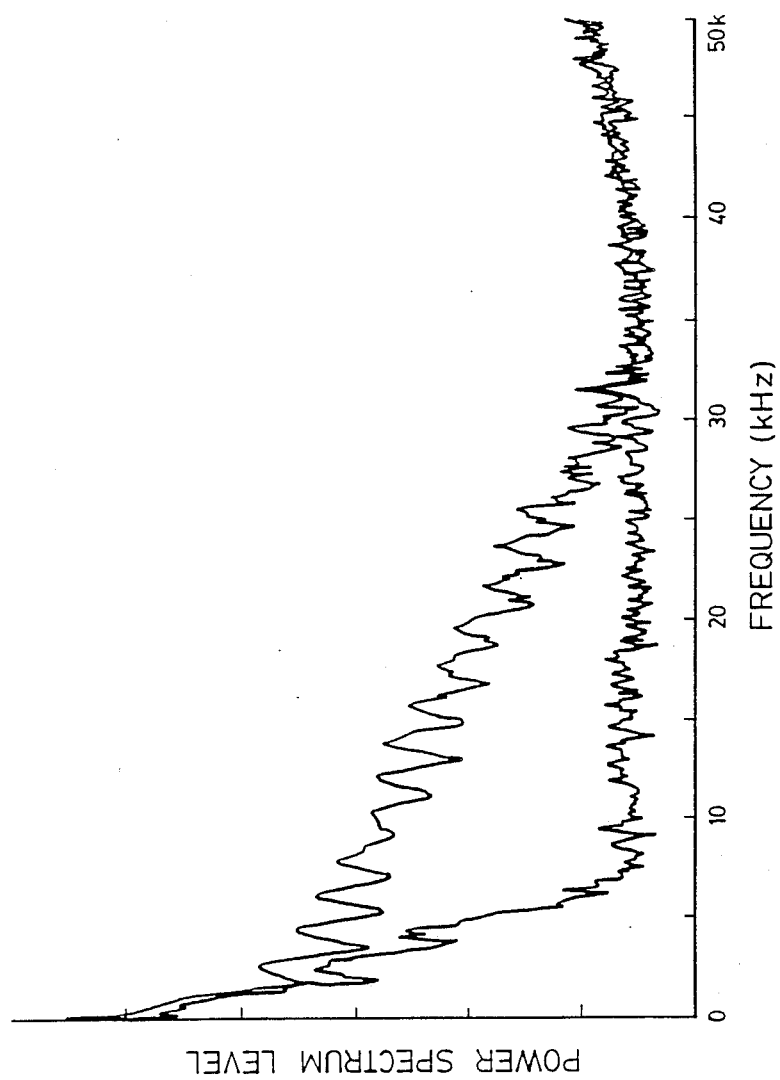

FIG. 31 shows for comparison two power spectrum plots, using both the known equipment and the new equipment, where the target is a steel ball. It is evident that the new equipment preserves more information provided by the received signals.

Figure 32:
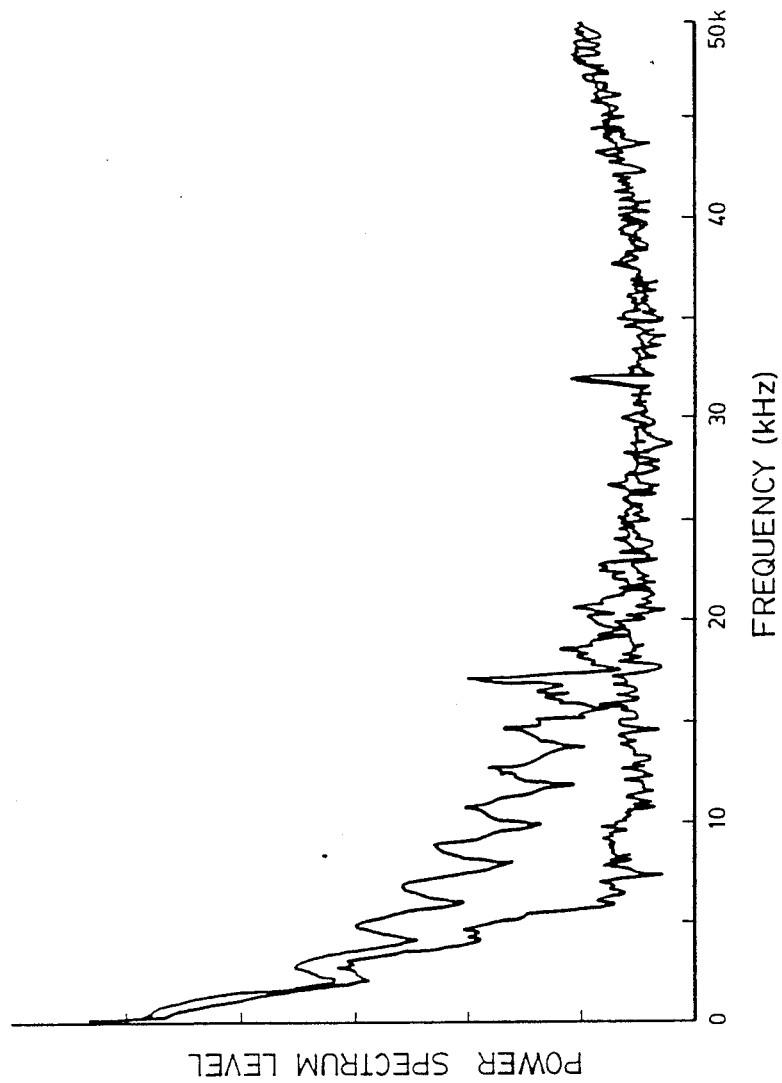

FIG. 32 shows the comparative power spectrum plots for the two equipments where the target is a bark chip.

Figure 33:
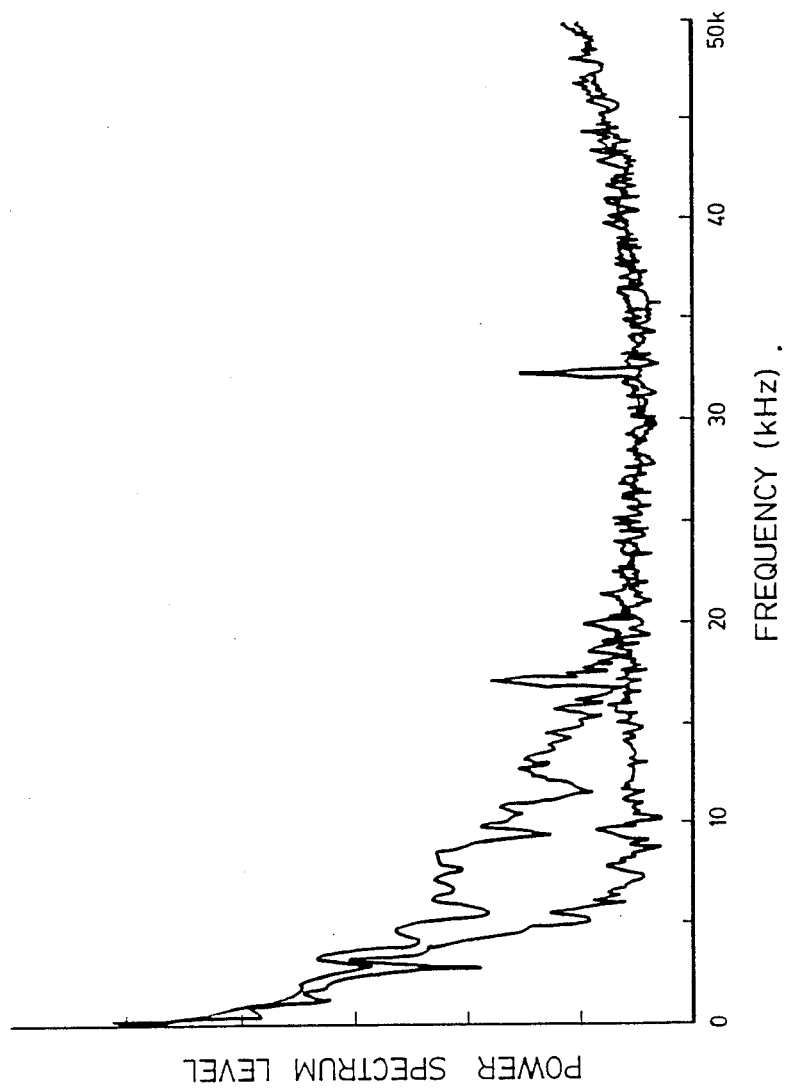

FIG. 33 similarly shows the comparative plots where the target is a leaf.

Figure 34:
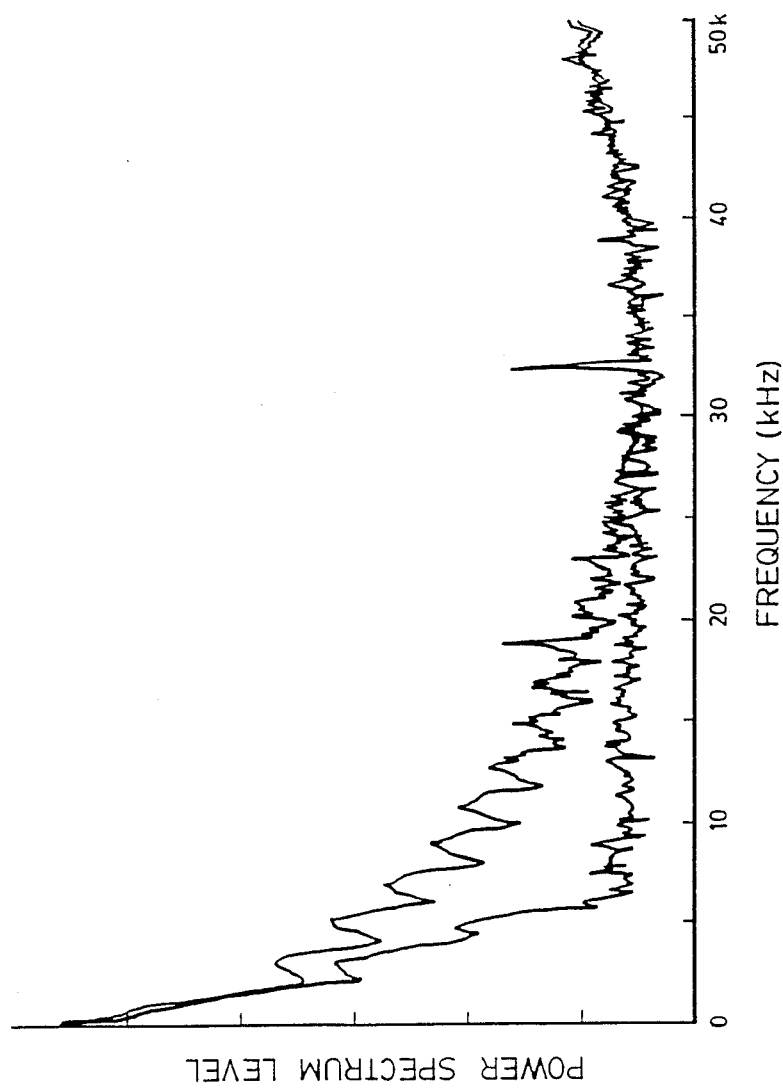

FIG. 34 similarly shows the comparative plots where the target is a ping pong ball.

Figure 35:
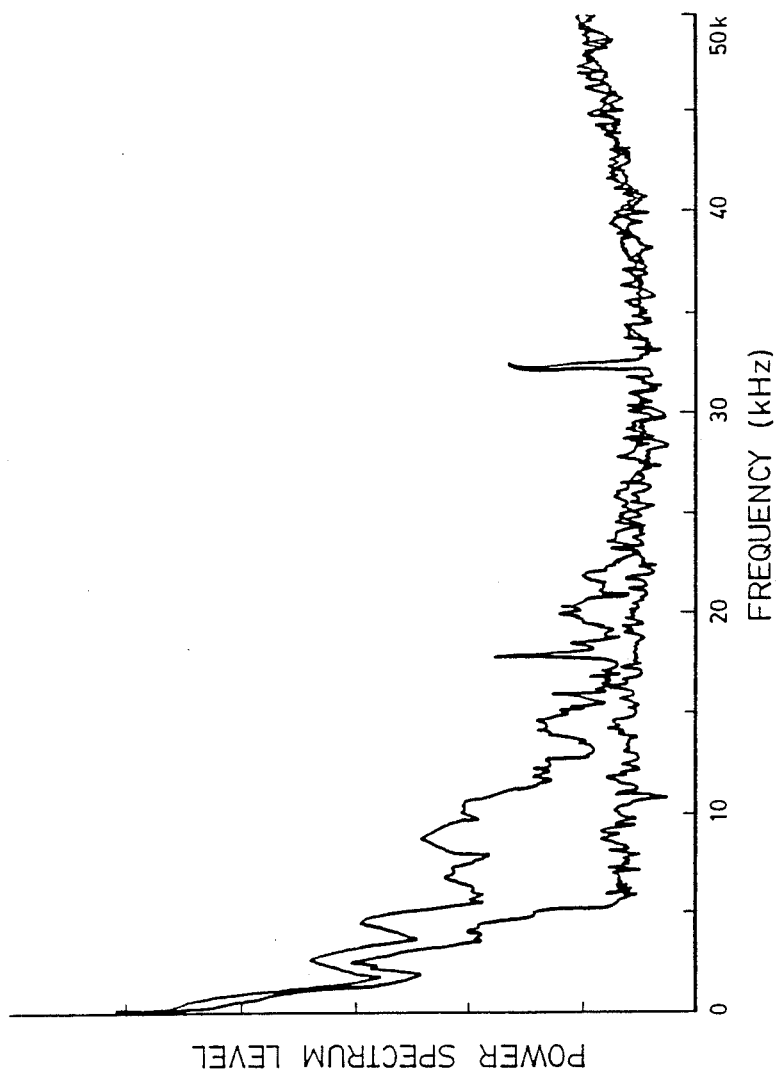

FIG. 35 similarly shows the comparative plots where the target is a ping pong ball filled with water.

Figure 36:
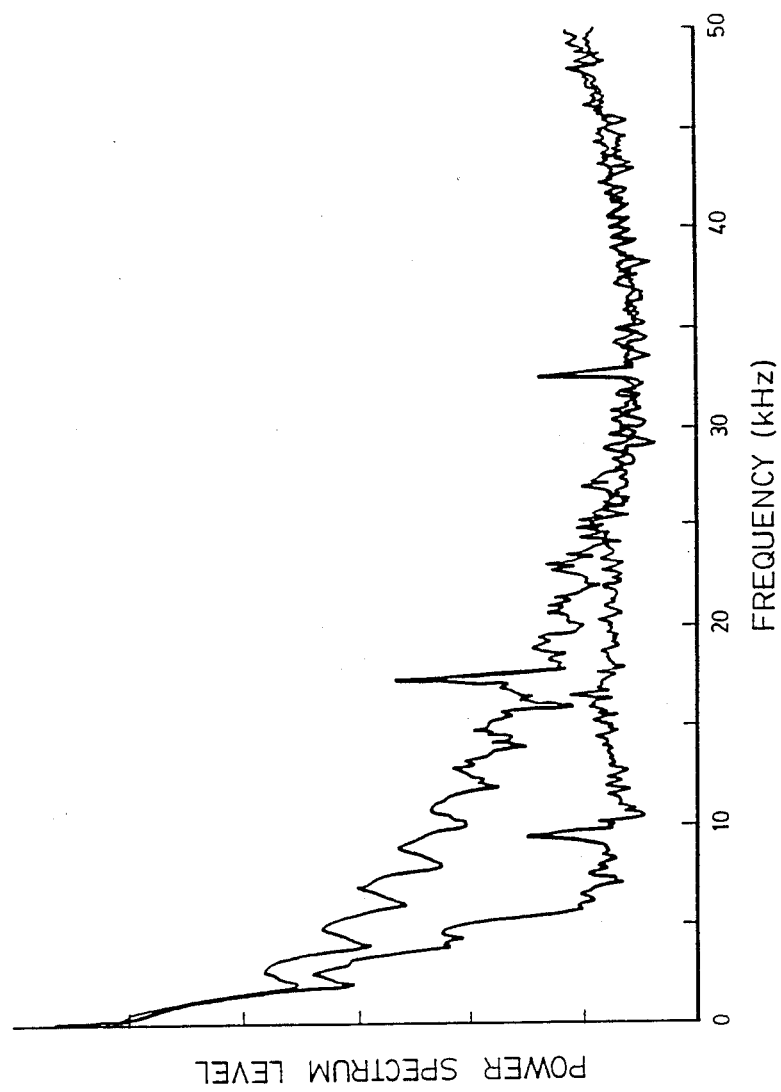

FIG. 36 similarly shows the comparative plots where the target is a styrofoam ball.

Figure 37:
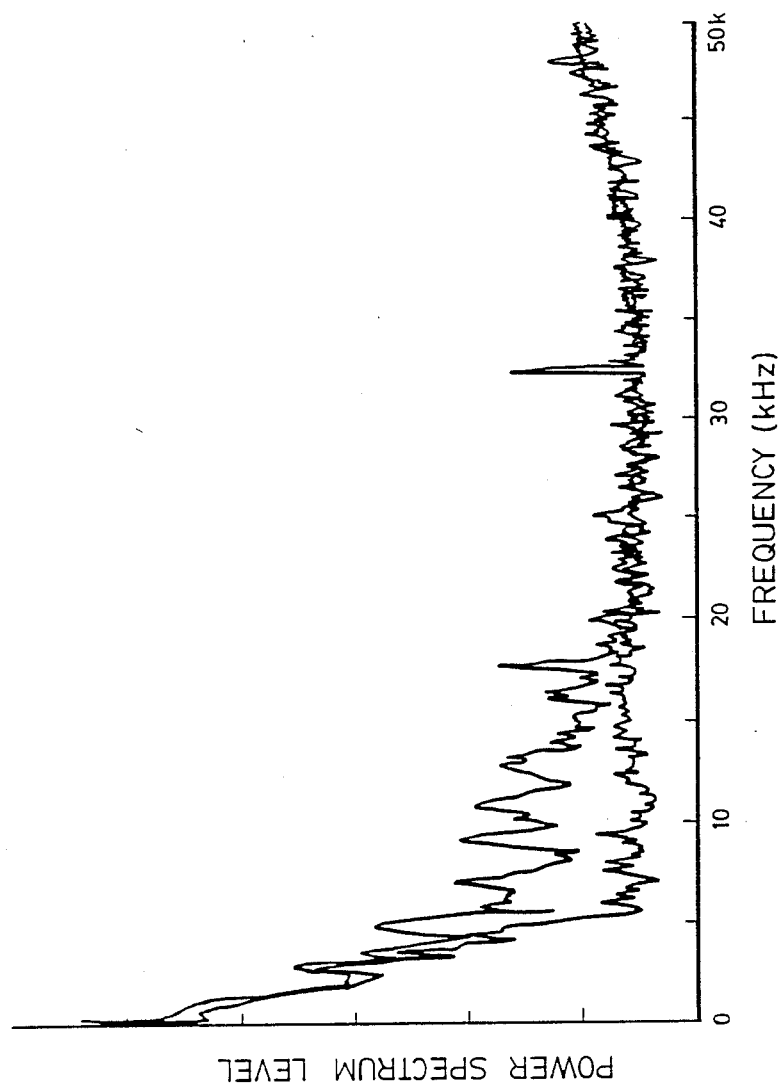

FIG. 37 shows the comparative plots where air bubbles are the target.

An inspection of the various backscattering curves shown in the drawings reveals important differences between the known sonar system and the modified system according to the present invention. In the known system considerable filtering occurs in both the intermediate frequency and detected outputs. This filtering does not appear to affect target strength estimates, at least when the transmitted pulses are of 0.5 ms pulse width, but does result in loss of valuable information in the received signals. For this reason the known sonar system probably cannot provide sufficient data either to classify fish or to distinguish fish from debris on the basis of the reflected signal alone. The modified system of the present invention, on the other hand, which uses the radio frequency output of the sounder, gives more detailed information in the backscattering curves of individual targets. The comparative results suggest qualitative differences among some of the targets; the differences are more particularly evident in the power spectrum plots, FIGS. 28–37. For example, from a comparison of the power spectrum plots for sturgeon (FIG. 29) and for air bubbles (FIG. 37), it appears that it may be possible to filter out or remove the influence of reflected signals from air bubbles in echo returns and so identify echo counts as actual fish counts.

Other important advantages of the modified system are the improved spatial resolution of targets, and the ability to estimate target strengths at lower pulse widths. These advantages are significant if biomass estimates are based on echo counting techniques rather than echo integration techniques.

We claim:

1. In a hydroacoustic sonar system comprising transmitter-receiver means for beaming a pulse modulated radio frequency acoustic signal towards a target and receiving an echo signal reflected from the target, and means for deriving from the received echo signal a time varied gain corrected electrical signal to be demodulated and recorded, an improved means for demodulating said electrical signal comprising an input amplifier having a bandwidth of at least 500 kHz, a full wave detector means having a bandwidth of at least 500 kHz, the detector being coupled to the output of the amplifier, and an active low pass filter coupled to the output of the detector, the low pass filer having a cut off frequency of at least 50 kHz.

2. A hydroacoustic sonar system according to claim 1, wherein the input amplifier and the full wave detector each have a bandwidth of at least 1.2 MHz.

* * * * *